(12) United States Patent
Gopalakrishnan et al.

(10) Patent No.: US 7,729,325 B2
(45) Date of Patent: Jun. 1, 2010

(54) BEAMFORMING AND DISTRIBUTED OPPORTUNISTIC SCHEDULING IN WIRELESS NETWORKS

(75) Inventors: Praveen Gopalakrishnan, Somerset, NJ (US); David Famolari, Montclair, NJ (US); Shuichi Obayashi, Fort Lee, NJ (US); Raziq Yaqub, Stewartsville, NJ (US)

(73) Assignees: Toshiba America Research, Inc., Piscataway; Telecordia Technologies, Inc., Piscataway ( * ) Notice: Subject to any disclaimer, the term of this patent is extended or adjusted under 35 U.S.C. 154(b) by 1051 days.

(21) Appl. No.: 11/099,234

(22) Filed: Apr. 5, 2005

(65) Prior Publication Data
US 2006/0221920 A1    Oct. 5, 2006

(51) Int. Cl.
    *H04W 4/00* (2009.01)
(52) U.S. Cl. ........................... 370/338; 370/328
(58) Field of Classification Search ............ 370/338, 370/328
    See application file for complete search history.

(56) References Cited

U.S. PATENT DOCUMENTS

| | | | |
|---|---|---|---|
| 6,249,249 B1 | 6/2001 | Obayashi et al. | |
| 6,466,165 B2 | 10/2002 | Obayashi | |
| 2005/0147177 A1* | 7/2005 | Seo et al. | 375/267 |
| 2005/0255892 A1* | 11/2005 | Wong et al. | 455/562.1 |
| 2006/0046730 A1* | 3/2006 | Briancon et al. | 455/446 |
| 2006/0164969 A1* | 7/2006 | Malik et al. | 370/203 |
| 2006/0203789 A1* | 9/2006 | Iacono et al. | 370/338 |
| 2007/0064641 A1* | 3/2007 | Laroia et al. | 370/320 |
| 2007/0191063 A1* | 8/2007 | Iacono et al. | 455/561 |
| 2008/0037681 A1* | 2/2008 | Walton et al. | 375/267 |

OTHER PUBLICATIONS

Yang Xiao, Throughput and Delay Limits of IEEE 802.11, Aug. 2002, p. 355-357, vol. 6, Issue 8, USA.
Jangeun Jun, Theoretical Maximum Throughput of IEEE 802.11 and its Application, Apr. 16, 2003, p. 249-256, North Carolina State Univ., USA.
X. Qin, Exploiting Multiuser Diversity for Medium Access Control in Wireless Networks, Mar. 30, 2003, p. 1084-1094, vol. 2, USA.
J. Wang, Opportunistic Packet Scheduling and Media Access Control for Wireless LANs and Multi-hop Ad HOC Networks, Mar. 21, 2004, p. 1234-1239, vol. 2, USA.
R, Jain, A Quantitative Measure of Fairness and Discrimination For Resource Allocation In Shared Computer Systems, Sep. 1998, p. 1-2, USA.

* cited by examiner

*Primary Examiner*—Barry W Taylor
(74) *Attorney, Agent, or Firm*—Watchstone P&D, PLLC

(57) ABSTRACT

A system and method that addresses the issue of inducing and exploiting multi-user diversity in, e.g., a WLAN system in a fully distributed and opportunistic manner. In some embodiments, the system includes: an access point having a variable beamformer configured to fluctuate signal strength as perceived by stations within a range of the access point; and a plurality of stations having modified distributed-MAC protocol such as to be channel-aware and opportunistic.

25 Claims, 16 Drawing Sheets

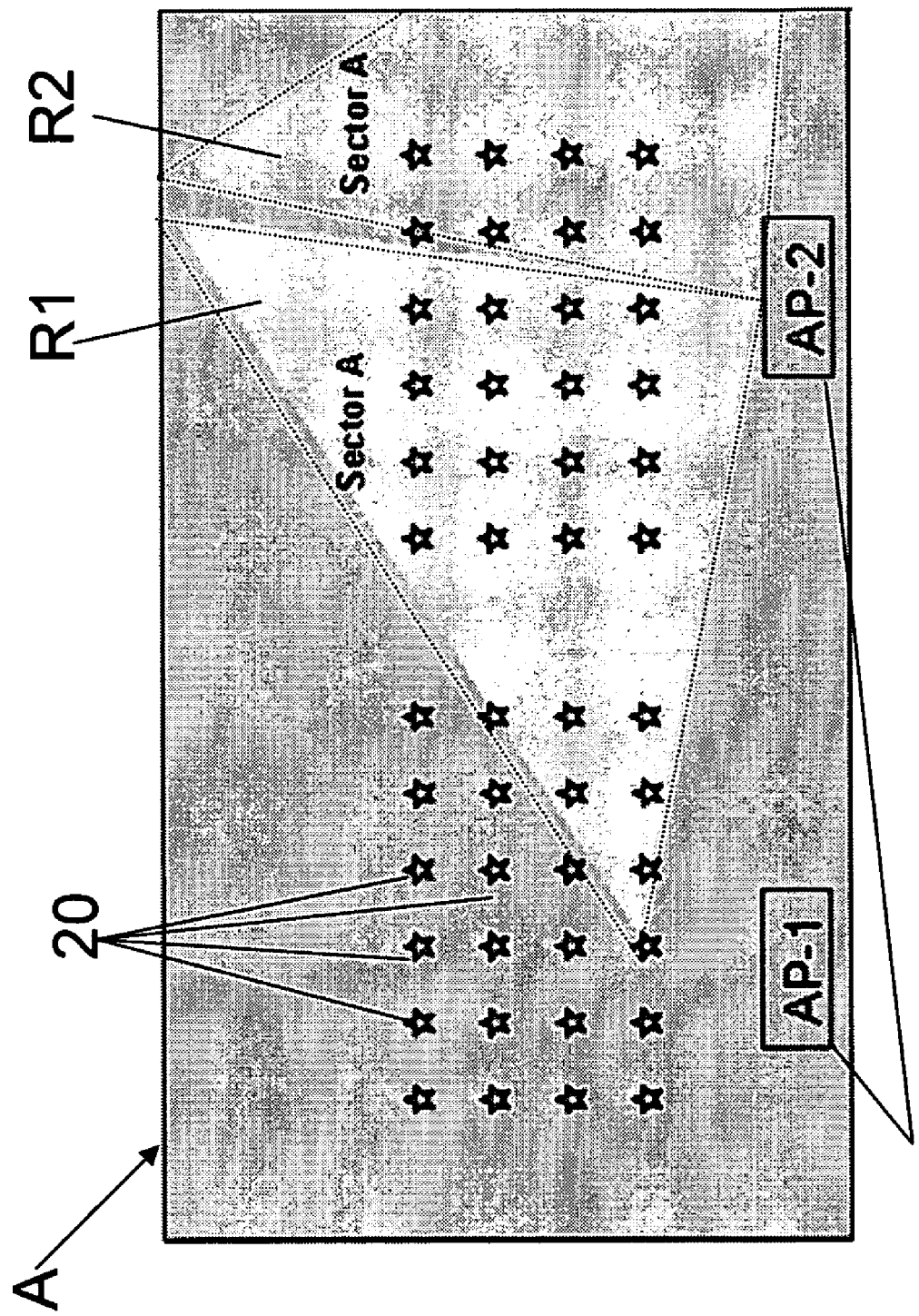

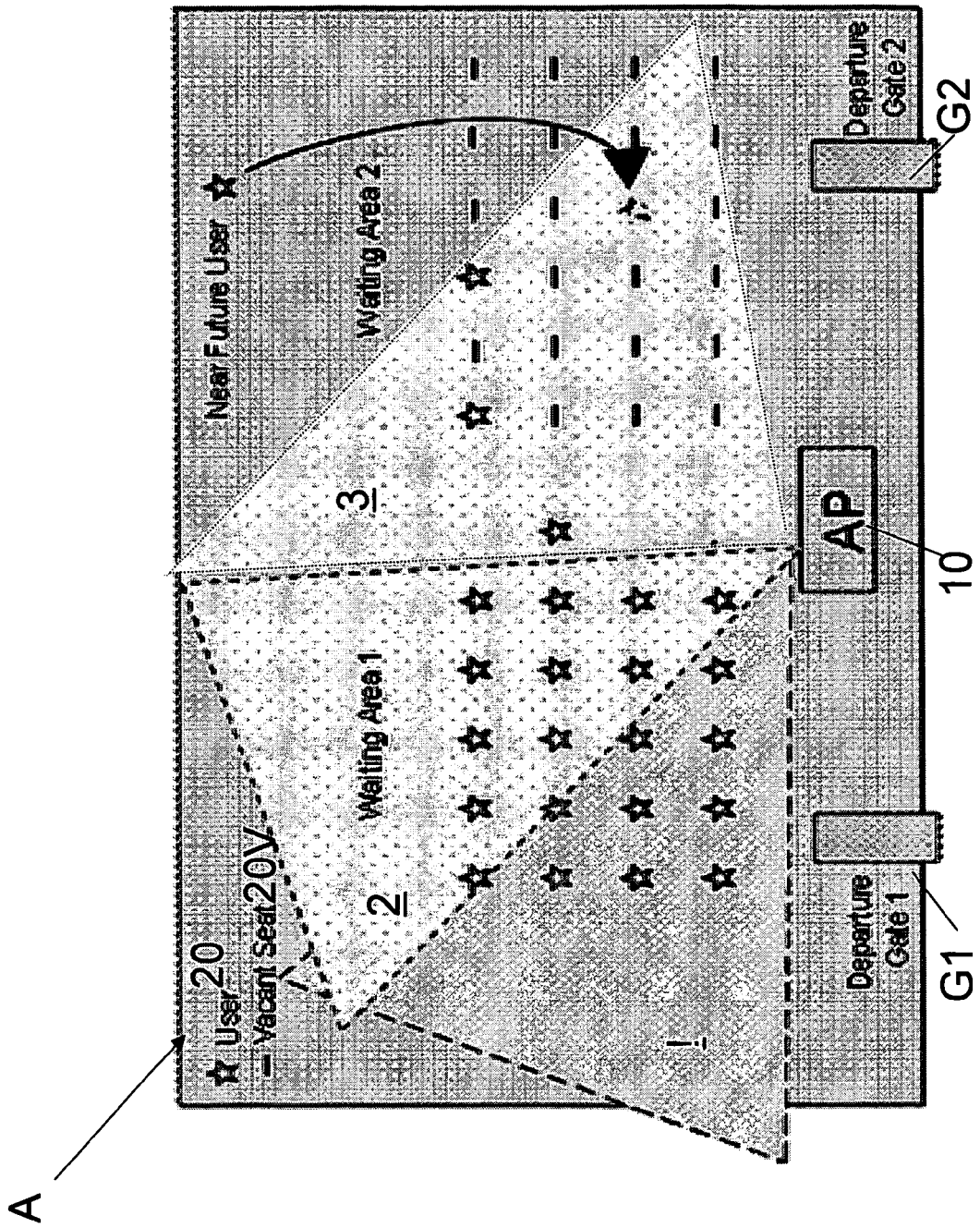
Figure 5: Uneven Users Distribution Scenario Splitting 2nd beam into two

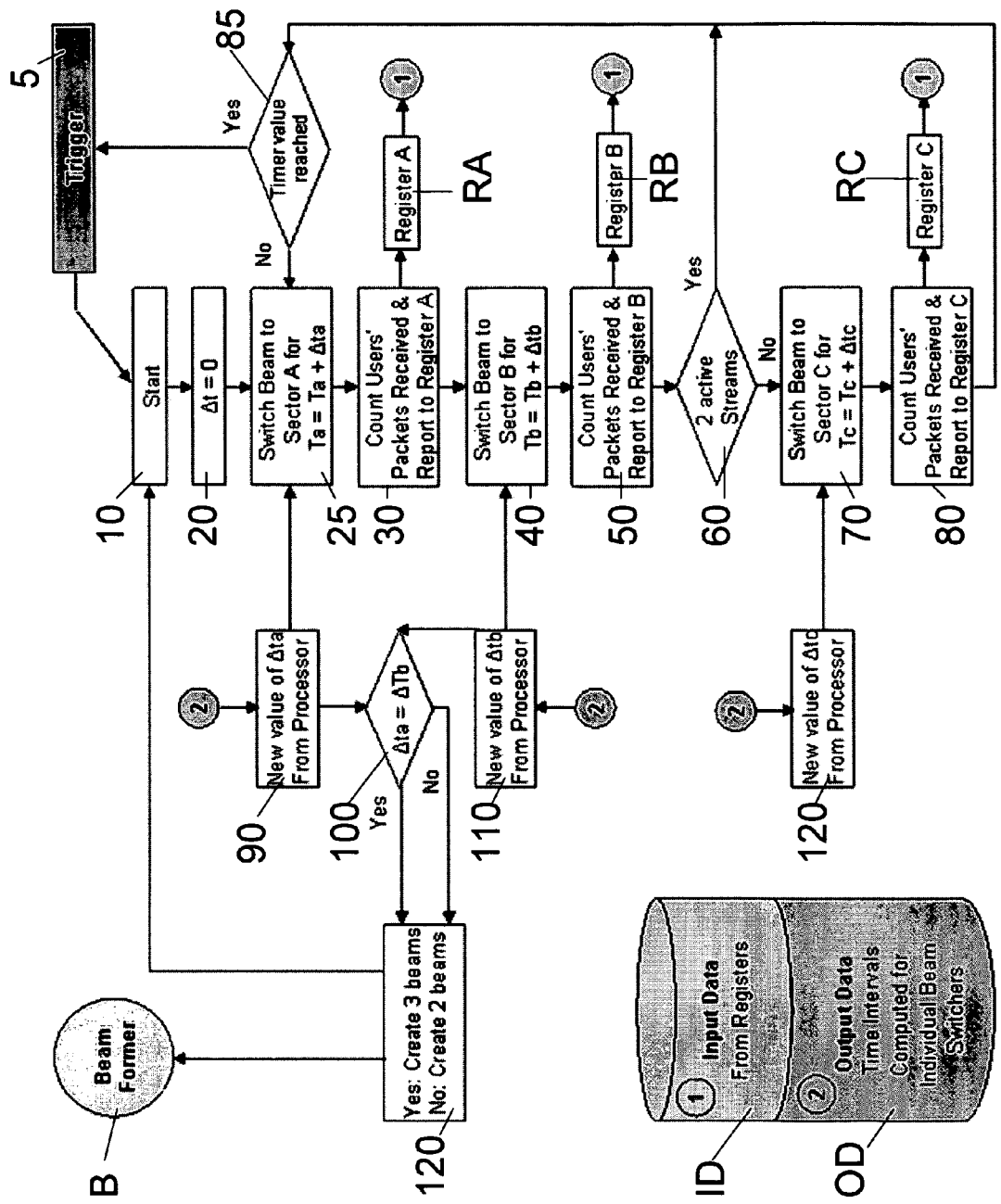
Figure 6: Beamforming with Adaptable Timing and Aperture (BATA)

FIG. 7

(a) $$\Delta t_a = \left(\frac{T.P_a}{P_a + P_b + P_c}\right) - T_a$$

(b) $$\Delta t_b = \left(\frac{T.P_b}{P_a + P_b + P_c}\right) - T_b$$

(c) $$\Delta t_c = \left(\frac{T.P_c}{P_a + P_b + P_c}\right) - T_c$$

Where T = Sum of time intervals the beam halts in each sector.
$T_a$ = Time the beam stayed in Sector a (dwell time)
$T_b$ = Time the beam stayed in Sector b (dwell time)
$T_c$ = Time the beam stayed in Sector c (dwell time)
$P_a$ = Packets received from Sector a, during duration $T_a$
$P_b$ = Packets received from Sector a, during duration $T_b$
$P_c$ = Packets received from Sector a, during duration $T_c$

BEAMFORMING AND DISTRIBUTED OPPORTUNISTIC SCHEDULING IN WIRELESS NETWORKS

BACKGROUND

1. Field of the Invention

The present application relates to wireless networking and, in some preferred embodiments, to systems and methods of performance enhancement of wireless local area networks and, in some preferred embodiments, to beamforming and opportunistic scheduling in wireless networks and/or the like.

2. General Background Discussion:

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., Ipv4, Ipv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Limitations of Existing Systems

Existing systems have a variety of limitations, including, e.g., limitations due to the fixed amount of resources available, such as, e.g., limitations on bandwidth and power. A number of existing systems are described in the following three references, the disclosures of which are incorporated herein into this application in their entireties.

1) B. Sadeghi, V. Kanodia, A. Sabharwal, E. Knightly, *OAR: An Opportunistic Auto-Rate Media Access Protocol For Ad Hoc Networks*, ACM Mobicom 2002 (hereinafter Reference 1). In Reference 1, the authors propose a technique to send multiple packets back-to-back when channel conditions are good, which they call as Opportunistic Auto Rate (OAR). The authors claim that this scheme enables users to increase their throughput. The OAR scheme in Reference 1, however, gives any such throughput enhancement at the expense of favoring users with high data rates. The number of packets that can be transmitted back-to-back is inversely proportional to the current data rate, and this makes the system highly unfair from an individual throughput perspective.

2) J. Wang, H. Zhai, Y. Fang, *Opportunistic Packet Scheduling For Media Access Control For Wlans And Multi-Hop Ad Hoc Networks*, IEEE WCNC 2004 (hereinafter Reference 2). In Reference 2, the authors propose an Opportunistic packet scheduling and Media Access Control (OSMA) protocol to exploit the multiuser diversity gain in WLAN systems. If the MAC queue of the AP (or station in ad-hoc networks) contain packets destined for multiple stations, the OSMA protocol provides a method to select the next packet to be transmitted based on channel quality estimates and other QoS parameters. The OSMA scheme in Reference 2 addresses the issue only at those WLAN entities which have packets to transmit to multiple stations. The method does not apply to stations in a WLAN infrastructure system (which transmit packet only to the AP), and hence fails to give high throughput gains in an infrastructure mode system.

3) X. Qin, R. Berry, *Exploiting Multiuser Diversity for Medium Access Control in Wireless Networks*, IEEE Infocom 2003 (hereinafter Reference 3). In Reference 3 the authors propose a variation of the ALOHA protocol, the channel-aware ALOHA. With this protocol, users randomly transmit with a transmission probability that is based on their channel gain. This in effect leads to a distributed scheduling system that attempts to exploit the multiuser diversity effect of scheduling transmissions when the channel conditions are favorable. The work in Reference 3 focuses on an ALOHA based system and as such is not directly applicable to CSMA/CA based WLAN systems.

Other general background references, the entire disclosures of which are incorporated herein by reference, are listed below.

1. IEEE 802.11 standard: Wireless LAN MAC and PHY layer specifications, 1999;

2. Y. Xiao, J. Rosdahl, *Throughput and Delay Limits of IEEE 802.11*, IEEE Communication Letters, Vol. 6, Number 8, August 2002;

3. J. Jun, P. Peddabachagari, M. Sichitiu, *Theoretical Maximum Throughput of IEEE 802.11 and its Applications*, Proceeding of the $2^{nd}$ IEEE International Symposium on Network Computing and Applications 2003 (NCA '03);

4. A. F. Molisch, D. Gu, J. Zhang, N. Mehta, *Physical layer and Medium Access Control laver Proposal for IEEE 802.11 n*, Sep. 1, 2004, IEEE 802.11 groups;

5. IEEE 802.11e, *Wireless LAN Medium Access Control (MAC) and Physical Laver (PHY) Specifications: Medium Access Control (MAC) Enhancements for Quality of Service (QoS)*, Draft v9, IEEE, August 2004;

6. Official website of IEEE 802.11 [http://qrouper.ieee.orq/qroups/802/11/];

7. P. Vishwanath, D. N. Tse, R. Laroria, *Opportunistic Beamforming Using Dumb Antennas*, IEEE Transactions on Information Theory, 2002;

8. B. Sadeghi, V. Kanodia, A. Sabharwal, E. Knightly, *OAR: An Opportunistic Auto-Rate Media Access Protocol for Ad Hoc Networks"*, ACM Mobicom 2002;

9. Z. Ji, et. al., *Exploiting Medium Access Diversity in Rate-Adaptive WLANs*, ACM Mobicom 2004;

10. X. Qin, R. Berry, *Exploiting Multiuser Diversity for Medium Access Control in Wireless Networks*, IEEE Infocom 2003;

11. J. Wang, H. Zhai, Y. Fang, *Opportunistic Packet Scheduling for Media Access Control for WLANs and Multi-hop Ad Hoc networks*, IEEE WCNC 2004;

12. R. Jain, W. Hawe, D. Chiu, *A Quantitative Measure of Fairness and Discrimination for Resource Allocation in Shared Computer Systems*, DEC-TR-301, September 1984.

While a variety of systems and methods are known, there remains a need for improved systems and methods that can best make use of a fixed amount of resources in WLANs and/or the like, such as, e.g., bandwidth and power.

SUMMARY OF THE PREFERRED EMBODIMENTS

The preferred embodiments of the present invention can significantly improve upon existing methods and/or apparatuses.

According to the preferred embodiments, systems and methods are provided that address the issue of inducing and exploiting multi-user diversity in, e.g., a WLAN system in a substantially fully distributed and opportunistic manner.

According to some embodiments, a novel system architecture is presented that enables Wireless Local Area Network (WLAN) devices and networks to achieve improved performance by opportunistic exploitation of induced channel variations. Preferably, the system creates high channel variations using a beam-former at an Access Point (AP) and makes use of this induced channel variation using a distributed and opportunistic scheduling mechanism. In the preferred embodiments, the net result is a wireless system with significantly less collision probability leading to improvement in the throughput and energy consumption of the WLAN devices. This work shows how such a high efficiency technique can be implemented in future WLAN devices, within the framework of the current and proposed IEEE 802.11 WLAN standards.

According to some embodiments, a system and method for inducing substantial fluctuations in signal strength as perceived by stations connected to an AP is provided, whereby, among other things, temporary variations can be exploited such as to make the existing distributed-MAC protocol, channel aware and opportunistic. Among other potential benefits, this can result in a WLAN system in which the individual users have:

a) better throughput performance; and/or
b) better energy utilization.

In some embodiments, a system and method is provided that can improve throughput and/or energy consumption metrics for a WLAN in the infrastructure mode, while using a distributed contention based medium access scheme (such as, e.g., 802.11 DCF), in a manner that enhances fairness for the various users of the network.

According to some embodiments, a method for improving performance and/or energy utilization in a WLAN system is performed that includes: a) inducing fluctuations in signal strength transmitted from an access point to stations within a transmission range of the access point; and b) exploiting the induced fluctuations to make the stations channel aware and opportunistic.

According to some embodiments, a system for enhancing the performance of a WLAN system is performed that includes: a) an access point having a variable beamformer configured to fluctuate signal strength as perceived by stations within a range of the access point; b) a plurality of stations having modified distributed-MAC protocol such as to be channel-aware and opportunistic. In some examples, the system further includes that the stations are configured to either transmit multiple back-to-back packets or to not contend for the medium based channel in response to variations from the variable beamformer. In some examples, the variable beamformer is configured to change a beamforming pattern to cover different stations at different time periods. In some examples, the beamformer creates a beamforming pattern such that stations inside of the beamforming pattern have a high link-quality and stations outside the beamforming pattern have poor link-quality. In some examples, the system is configured to categorize link quality at the stations and to opportunistically vary transmission based on the link quality.

In some embodiments, the access point is configured to provide an adaptable beam-traversal timing functionality to adaptively change the dwell time in each sector to devote more time in a sector of a given area where more users are clustered. And, in some examples, the access point is configured to provide an adaptable beam-traversal timing such that the beamformer adaptively changes the beam dimensions, beam widths or positions, or the total number of sectors.

In some embodiments, the access point is configured to either count packets received from each sector or to determine channel activity or contention from each sector and to compute a value of time correction for controlling a beamformer switcher to switch the beam accordingly.

According to some other embodiments, a method for enhancing a WLAN infrastructure system is performed that includes: using Distributed Opportunistic Scheduling (DOS) to exploit an access point radiation-beam induced multi-user diversity, providing variations in channel conditions among users, by transmitting back-to-back packets when channel conditions are favorable to reduce inter-transmission delays and by withholding transmission when channel conditions are unfavorable to reduce collision probability.

According to some other embodiments, an improved WLAN system is provided that includes: a) an access point including: a distributed opportunistic scheduling unit configured to make scheduling decisions about which station to transmit packets to and which medium access mode to operate in; a poll control unit configured to send messages to stations and to receive responses from stations and to report to the distributed opportunistic scheduling unit based on the responses; and a beamform controller unit configured to control an antenna to form specific beam patterns; and b) at least one mobile station including: a distributed opportunistic scheduling unit configured to make scheduling decisions, which computes quality metrics with the access point and decides the mode of operation before starting a transmission process.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 4 is a schematic diagram illustrating an unsymmetrical APs installation scenario;

FIG. 5 is a schematic diagram illustrating an uneven user distribution scenario splitting a $2^{nd}$ beam into two beams;

FIG. 6 is a flow diagram illustrating beamforming with adaptable timing and aperture (BATA);

FIG. 7 depicts some illustrative formulas according to some embodiments;

DETAILED DESCRIPTION OF THE PREFERRED EMBODIMENTS

Figure 1:
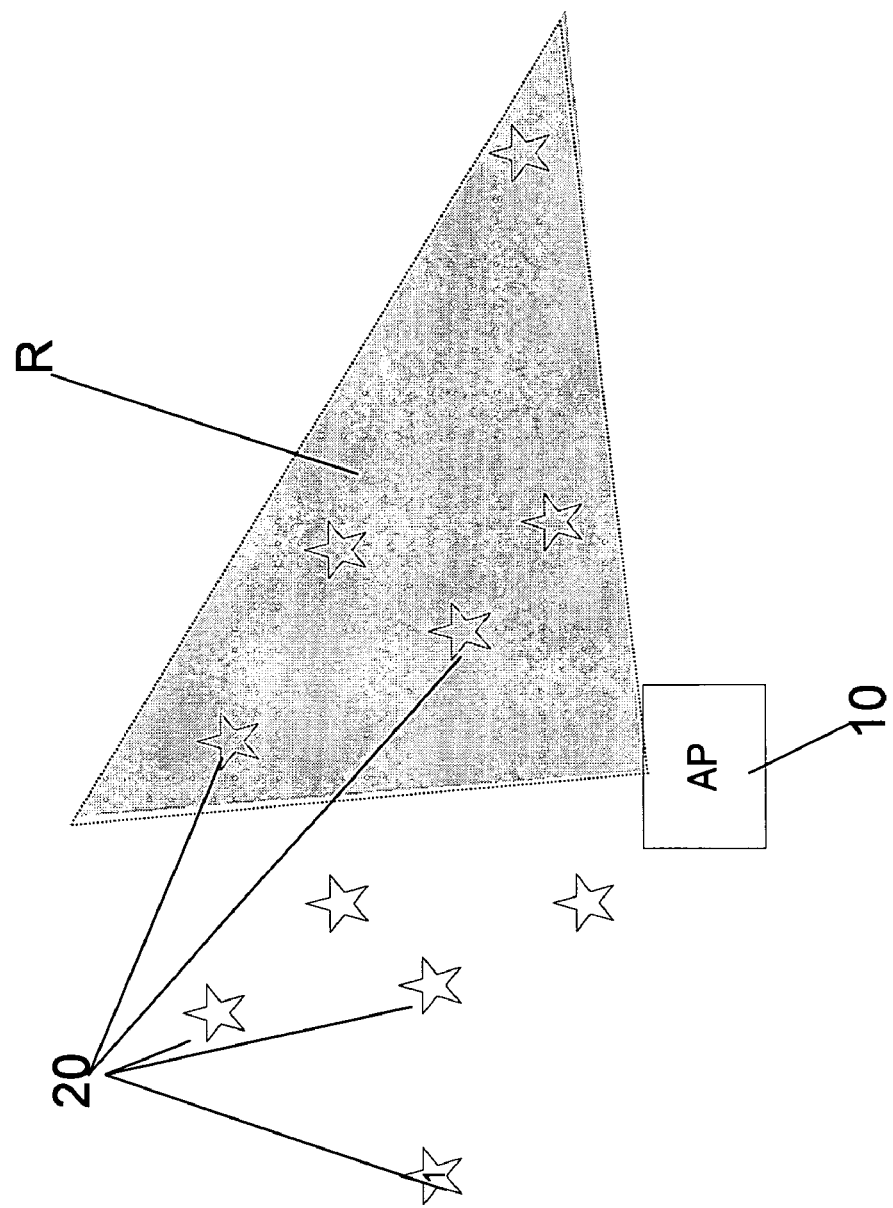
FIG. 1 is a schematic diagram showing an illustrative AP beamforming pattern.

While the present invention may be embodied in many different forms, a number of illustrative embodiments are described herein with the understanding that the present disclosure is to be considered as providing examples of the principles of the various inventions described herein and that such examples are not intended to limit the inventions to preferred embodiments described herein and/or illustrated herein.

Intoduction to the Preferred Embodiments

1. A Need for a Better MAC

The use of WLAN devices and the amount of traffic carried by WLAN networks continue to grow significantly, whereas the amount of available resources including bandwidth and power does not scale accordingly. Next generation WLAN systems are preferably equipped to meet the demands for, among other things, a) higher throughput, b) better quality of service, c) longer reach and/or d) reduced battery consumption. A notable challenge for next generation WLAN systems involves the creation of smarter techniques to better exploit the limited amount of precious resources, such as, e.g., bandwidth and power. Techniques, including MIMO (i.e., the multiple input, multiple output an antenna technology for wireless communications in which multiple antennas are used at both the source and the destination) and more efficient forms of modulation and coding are some efforts that move towards addressing, among other things, issues at the physical (PHY) layer.

As the data rate grows, however, more and more multimedia applications start to be transported over, e.g., WLANs. Unfortunately, even the state-of-art IEEE 802.11 WLAN now available has limitations in the delivery of, e.g., enterprise-class traffic (e.g., voice over IP (VoIP), etc.) or consumer electronics traffic (e.g., HDTV, video streaming, etc.), which typically either has stringent quality of service (QoS) requirements and/or demands high bandwidth (e.g., at a magnitude of, e.g., 100 Mbps or more in some examples). Various PHY layer techniques, including MIMO and advanced modulation/coding (e.g., space time codes, low-density parity check (LDPC) codes) are significant in the addressing of present and future challenges, but they still have notable deficiencies.

Among other things, the current CSMA/CA based 802.11 MAC protocol plays a major role in determining the performance of WLAN systems. See, e.g., IEEE 802.11 standard, Wireless LAN MAC and PHY layer specifications, 1999, the entire disclosure of which is incorporated herein by reference.

As an illustration, the 802.11a PHY layer capable of delivering data rates up to 54 Mbps, when used over the 802.11 MAC, gives peak rates close to only 30 Mbps, even in a single user environment. Performance in a multi-user environment is generally worse. In view of, e.g., Y. Xiao, J. Rosdahl, *Throughput and Delay Limits of IEEE* 802.11, IEEE Communication Letters, Vol. 6, Number 8, August 2002 and A. F. Molisch, D. Gu, J. Zhang, N. Mehta, *Physical Layer and Medium Access Control Layer Proposal for IEEE* 802.11*n*, Sep. 1, 2004, IEEE 802.11 Groups, with the current contention-based 802.11 MAC layer, there exists an upper bound on the achievable MAC layer throughput and a lower bound on the delay, irrespective of the speed with which the PHY layer can transmit packets. Furthermore, as seen in J. Jun, P. Peddabachagari, M. Sichitiu, *Theoretical Maximum Throughput of IEEE* 802.11 *and Its Applications*, Proceeding of the $2^{nd}$ IEEE International Symposium on Network Computing and Applications 2003 (NCA '03), the entire disclosure of which is incorporated herein by reference, the protocol efficiency of the current MAC layer protocol drops when the PHY layer data rate grows.

Accordingly, there is an appreciable need to enhance, e.g., the current contention-based 802.11 MAC layer, to better meet the challenges of future WLAN usage.

Overview of the Preferred Embodiments

According to some embodiments, a system and method for inducing substantial fluctuations in signal strength as perceived by stations connected to an AP is provided, whereby, among other things, temporary variations can be exploited such as to make the existing distributed-MAC protocol, channel aware and opportunistic. Among other potential benefits, this can result in a WLAN system in which the individual users have:

a) better throughput performance; and/or b) better energy utilization.

According to some preferred embodiments, a WLAN system is provided that includes:

a) An Access Point (AP) provided with a beamformer which can change the transmitting radiation pattern in a desired way. In preferred embodiments, this results in large fluctuations in signal strength (e.g., link-quality) as perceived by stations connected to the AP.

b) One or more, preferably a plurality of, station(s) (i.e., end user terminals or nodes) that are provided with modifications to the existing distributed-MAC protocol, such as to make the stations channel-aware and opportunistic. In preferred embodiments, this enables the stations to transmit multiple back-to-back packets or not to contend for the medium based on the AP induced channel variations.

Reference is now made to FIG. 1 which depicts an infrastructure mode WLAN system. For reference, infrastructure mode wireless networking typically involves the bridging or joining of a wireless network to a wired Ethernet network. Typically, infrastructure mode wireless networking also supports central connection points for WLAN clients. A wireless Access Point is used for infrastructure mode wireless networking. To join the WLAN, the AP and all wireless clients can be, e.g., configured to use the same SSID. The AP is then typically cabled to the wired network to allow wireless clients access to, for example, Internet connections, or devices, such as, e.g., printers, etc. In some embodiments, other devices can be added, such as, e.g., adding additional APs to the WLAN to increase the reach of the infrastructure. As compared to, e.g., ad-hoc wireless networks, infrastructure mode networks can often offer the advantage of scalability, centralized security management and/or improved reach.

In the traditional IEEE 802.11 wireless LAN using infrastructure mode, all users typically share the same channel and all packets are forwarded by an Access Point (AP). As a result, as the number of users in the cell increases, the throughput for each user degrades substantially.

At the center of FIG. 1 is an illustrative Access Point (AP) 10. In addition, distributed throughout the network are WLAN terminals or stations 20 (represented by stars). The triangular shaded region R represents the current beamforming pattern of the AP. Thus, only the stations 20 which are in the beamforming pattern R experience a high link-quality at any time, and the stations 20 outside the pattern R will have poor link-quality. In the preferred embodiments, the AP periodically changes the beamforming pattern to cover different terminals (such that, e.g., all of the terminals can be covered with differing beamforming patterns).

In some illustrative embodiments, the AP can change its beamforming patterns using any appropriate beamforming techniques as would be appreciated by those in the art. By way of example, techniques as described in U.S. Pat. No. 6,249,249 (entitled Active Array Antenna System) and/or U.S. Pat. No. 6,466,165 (entitled Adaptive Array Antenna), both of which are assigned to Toshiba, the entire disclosures of which patents are incorporated herein in their entireties, could be employed in some embodiments, such as, e.g., employing a beamforming technique known as Adaptive Array steered by Local Phase Shifters (AA-LPS). In addition, in some embodiments, the APs can involve a variety of devices now or later known in the art, such as, e.g., as discussed above, Access Points, routers, gateways, bridges and/or other appropriate transceiver devices having AP functionality. In addition, devices can include, inter alia, any appropriate antenna structures, such as, e.g., directional antennas, etc. By way of example, directional antennas can include, e.g., phased antenna systems (e.g., systems where electromagnetic fields effectively add in some directions and cancel in other directions to provide a directional distribution), reflector grid directional antennas, yagi directional antennas, polarized directional antennas and/or any other now or later known directional antennas.

Figure 2:
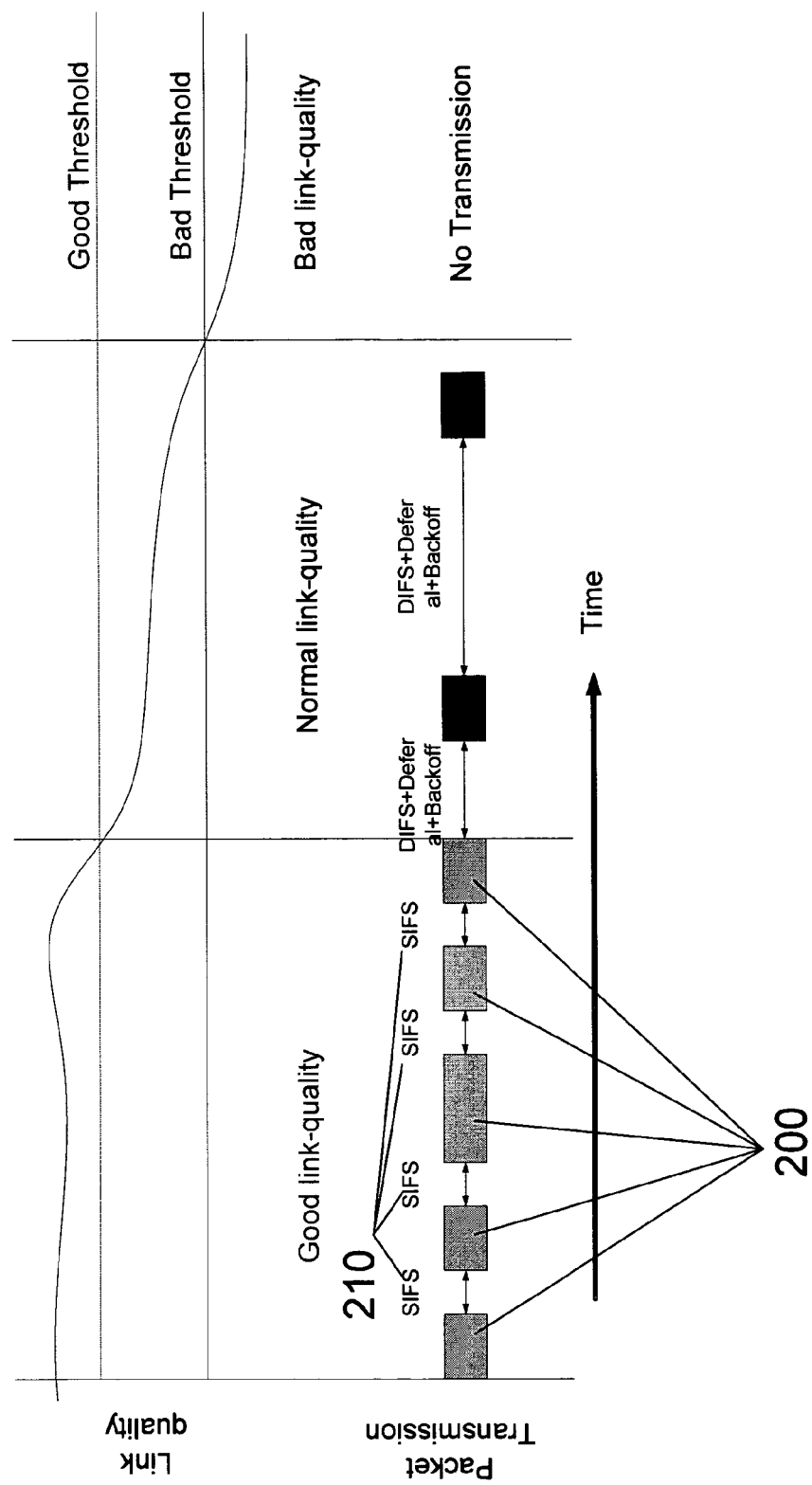
FIG. 2 is an explanatory graphical diagram illustrating the link quality modes at a station and corresponding packet transmissions.

FIG. 2 demonstrates a change in link-quality perceived by a station, with time, according to some illustrative embodiments. In this figure, the link-quality is categorized into three categories: "Good," "Normal," and "Bad," based on a comparison of the actual link-quality with the two thresholds: "Good Threshold" and "Bad Threshold." The MAC behavior of the station, in turn depends on the perceived link-quality categorization. If the link-quality is "Good," the packets are transmitted back-to-back (such as, e.g., shown using the shaded blocks 200 shown in FIG. 2), separated by a short SIFS period 210. When the link-quality is "normal," packets are transmitted one a time, requring re-contention and winning the medium to send another packet. When link-quality is perceived to be "bad," packets are not transmitted onto the medium.

In this illustrative, and non-limiting, example, a goal is to essentially split the number of users into groups having good, normal and bad link-quality at any given time. According to the preferred embodiments, this can be achieved through the implementation of a beamformer present in the AP. In this manner, a group of stations 20 (such as, e.g., those that are categorized as "bad") can be inhibited from contending for the channel at a given time. On the other hand, a group of stations 20 (such as, e.g., those that are categorized as "good") can make use of their link-quality by transmitting back-to-back packets. Thus, in some preferred embodiments, the distributed scheduling algorithm will induce stations 20 to wait until the beamforming pattern enables them to have a high-quality link (e.g., a high Signal to Noise Ratio (SNR)), to transmit its packets. In this disclosure, the terminologies "good", "normal" and "bad" encompass any circumstances in which different categories that may have different desirabilities are achieved, and, preferably, in which categories based on different levels of a certain quality is present.

According to some preferred embodiments, the system can include at least one, preferably both, of the following features: (a) an Automatically Adaptable Beam-Traversal Timing functionality; and/or (b) an Automatically Adaptable Beam Aperture functionality. In this regard, the Automatically Adaptable Beam-Traversal Timing functionality feature can enable the beam to adaptively change the dwell time in each sector. On the other hand, the Automatically Adaptable Beam Aperture functionality feature can enable the beamformer to adaptively change the beam widths and/or positions and/or the total number of sectors.

Figure 3A:
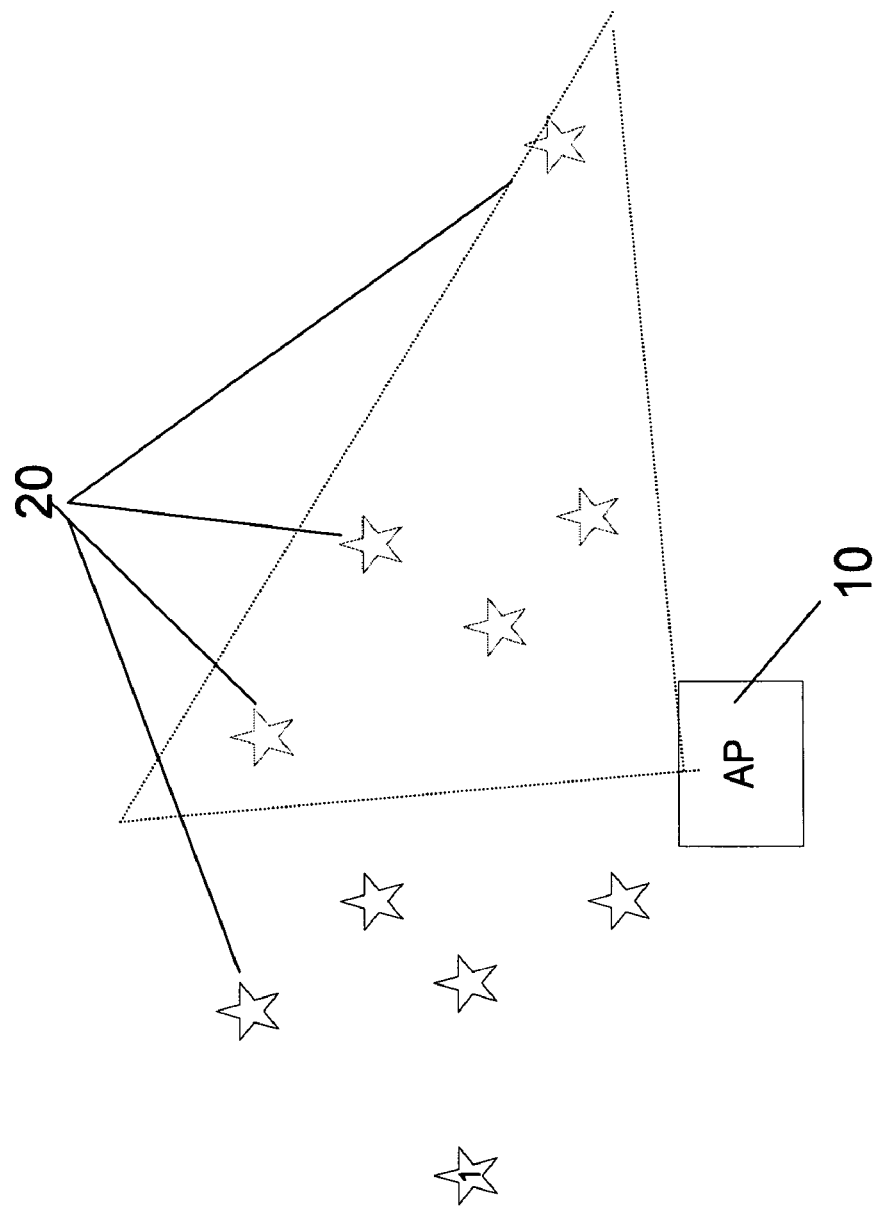
FIG. 3(A) is schematic diagram showing another illustrative AP beamforming; pattern.
Figure 3B:
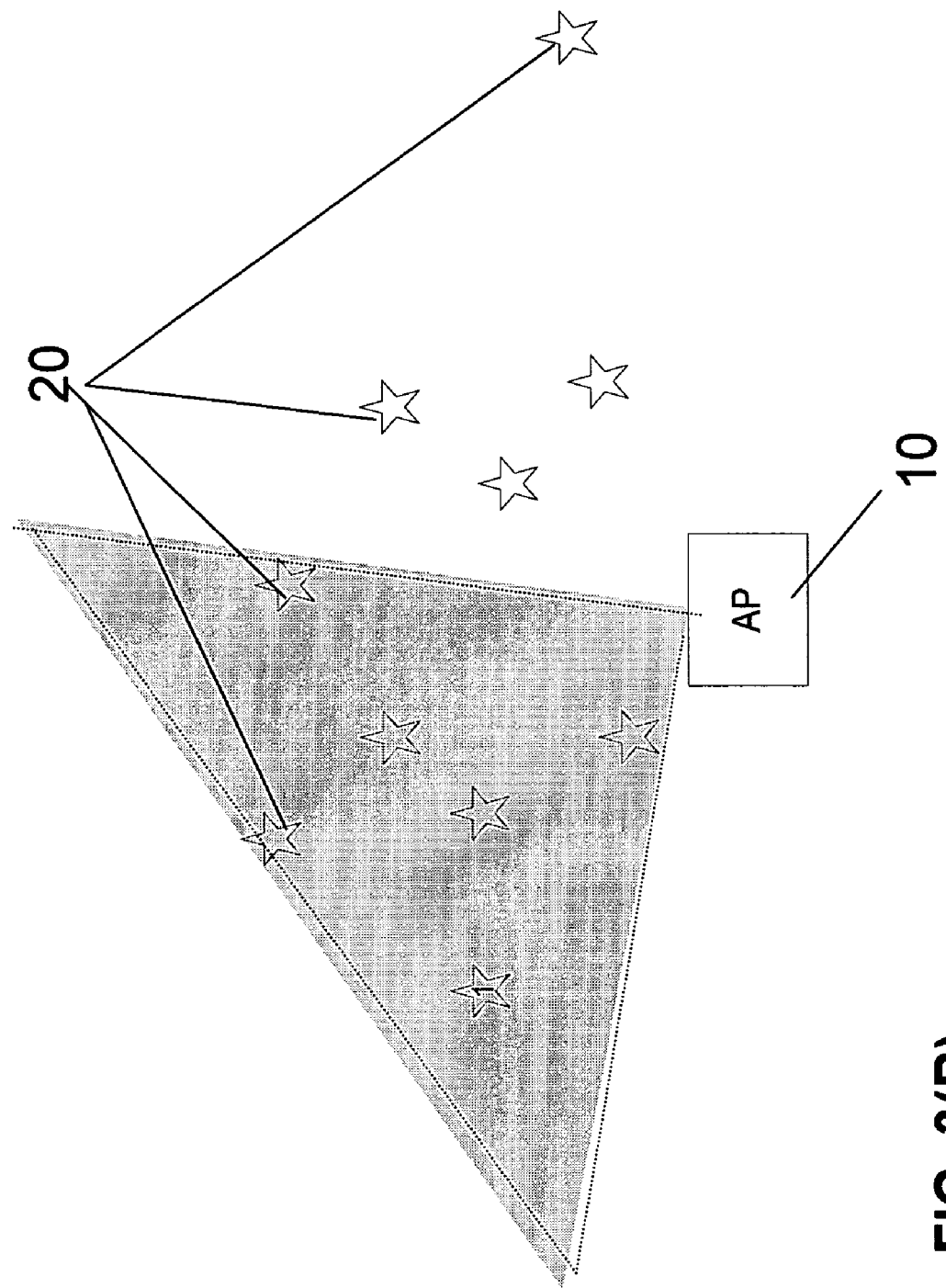
FIG. 3(B) is schematic diagram showing another illustrative AP beamforming; pattern.
Figure 3C:
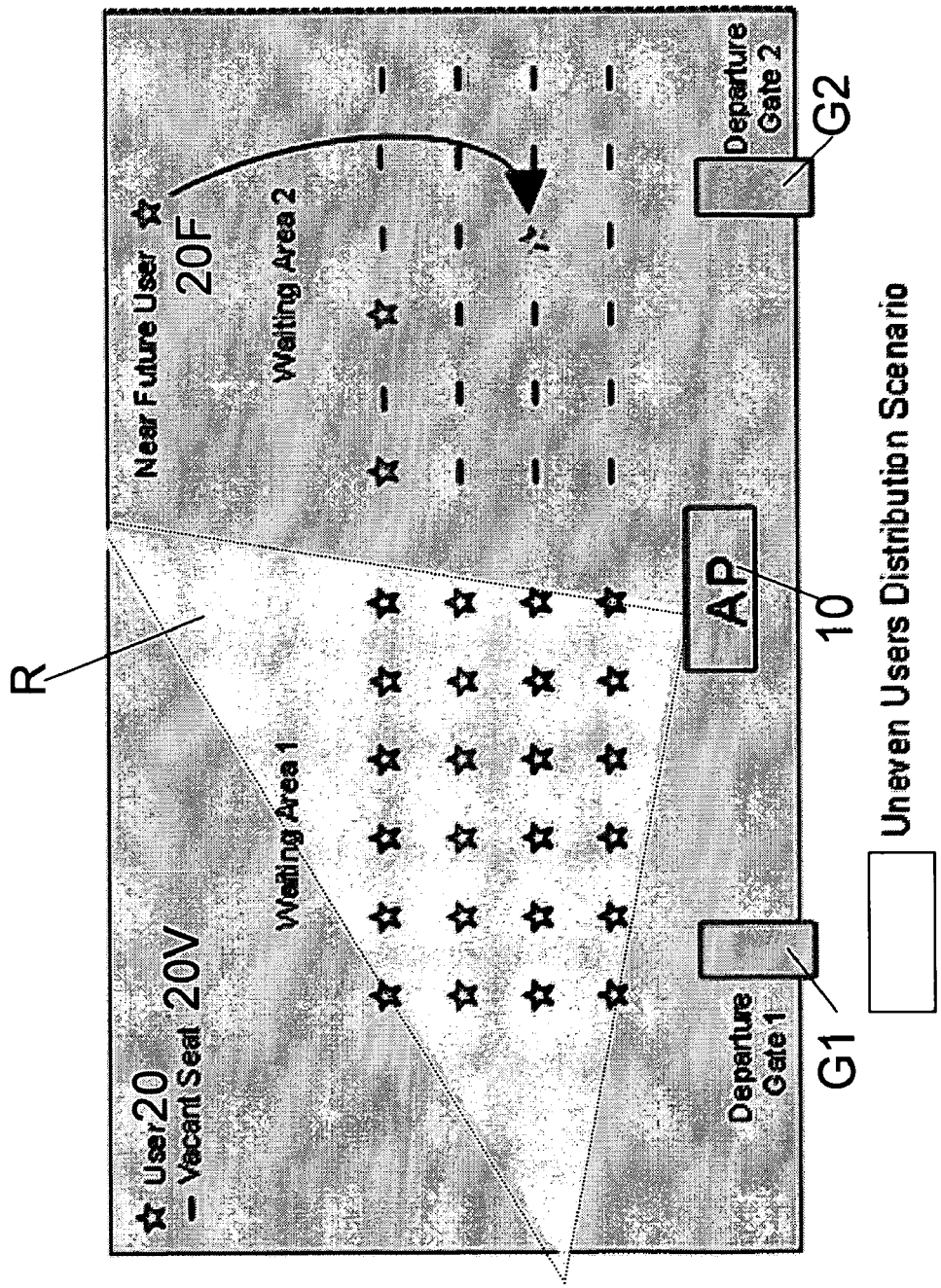
FIG. 3(C) is a schematic diagram illustrating an uneven user distribution scenario.

In some embodiments, the former feature will result in devoting more time in a sector of a given area where more users are clustered. On the other hand, the latter feature can be used to, e.g., further split the beam in such a way that a densely clustered user space is partitioned into multiple segments. The first method can be particularly useful when implemented with a simple beamformer which has a fixed number of sectors and/or beamwidths. On the other hand, the latter method can be particularly useful in conjunction with a beamformer which can change the beamwidth and/or the number of sectors. Among other things, this can enable reduced sets of mobile stations to have strong signals at intervals of time. In some embodiments, these two features can be used in catering to the following three scenarios (as well as to a variety of other scenarios):

Scenario A (Uneven Users Distribution):

According to this illustrative scenario, there is an uneven distribution of users in a region covered by an Access Point. FIG. 3(C) illustrates an exemplary situation involving this type of scenario. While FIG. 3(C) shows an illustrative example within an airport at a vicinity adjacent two airport departure gates G1 and G2, it should be appreciated that this scenario can be related to an enormous variety of environments and implementations. As shown in the exemplary arrangement in FIG. 3(C), passengers having wireless stations are distributed (and, thus, so is their data traffic) into two adjacent waiting areas, Waiting Area 1 and Waiting Area 2, served by a single Access Point (AP) 10. In this embodiment, the passenger distribution may vary significantly, such as, e.g., varying based on, e.g., the time of the day (e.g., depending on flight departure schedules, etc.) and/or the like. In the embodiment shown in FIG. 3, the implementation of a "star" 20 depicts a user having a user station 20. On the other hand, the implementation of a "dash" 20V depicts a vacant seat— i.e., a seat without a user having a user station. In addition, the implementation of a broken-lined star 20F depicts a near future user as shown.

Scenario B (Unsymmetrical APs installation):

According to this scenario, there is an asymmetrical installation of APs in a given environment. FIG. 4 shows an illustrative example of this scenario, employing two APs 10, AP-1 and AP-2, in an area A. Among other things, this example may be employed, e.g., in large meeting rooms, convention centers and/or the like where there may be a need to install more than one AP. As shown in FIG. 4, this scenario may lead to an APs' beam experiencing asymmetrical or unsymmetrical user distribution and, consequently, a significant variability in data traffic in the certain sectors of a given coverage area.

Scenario C (Densely Clustered Users in One Sector):

According to this scenario, there is a dense clustor of users in a particular sector of an area. FIG. 5 shows an illustrative example of this scenario, employing one AP 10, in an area A in which there are two waiting areas, Waiting Area 1 and Waiting Area 2 for users 20. This type of scenario can be anticipated if a larger % of users (such as, e.g., closer to or even about 100%) are in, for example, a Sector 1 and a lower % of users (such as, e.g., closer to or even about 0%) are in, for example, a Sector 3.

For example, with reference to FIG. 5, consider, e.g., a scenario (slightly different from that illustrated) in which all or substantially all of the users 20 are located in Sector 1, while Sectors 2 and 3 include vacant seats 20V (i.e., no users having stations 20). In this latter illustrative scenario, all or substantially all of the users 20 would happen to be treated by one beam segment while other beam segments would have no one to deal with. Accordingly, this scenario would lead to more contention (e.g., a higher contention within Sector 1), rather than less, contention.

In view of, e.g., scenarios A and B, it is deemed that in some circumstances it can be helpful for a beam to stay in one sector for a longer time or duration (e.g., staying longer in a sector where more users come across, than in another sector where less users come across). On the other hand, situations such as, e.g., depicted in scenario C demonstrate that contention reduction could potentially be jeopardized where a beam stays in one sector for a longer time or duration. Thus, in some preferred embodiments, a method is provided that involves further splitting of a beam segment that experiences a heavy traffic burden, such that a fraction of the users 20 are supported in one sub-segment and another fraction (such as, e.g., the rest of the users) are supported in another sub-segment—e.g., such that a reduced set of terminals will enjoy strong signals and reduced contention.

In this disclosure, the terminology "Automatically Adaptable Beam-Traversal Timing" and "Automatically Adaptable Beam Aperture" will be together referred as "Beamforming with Adaptable Traversal Timing and Aperture" (herein after BATA). In some preferred embodiments, a BATA system and method can be implemented in accordance with the flow chart and algorithms shown in FIG. 6.

In the illustrative, and non-limiting, example shown in FIG. 6, a BATA process can include some or all of the process steps described below. In this regard, in some illustrative embodiments, a method can involve some, or all, of the following process steps.

Initially at a step 5, a trigger can initiate the process.

Next, at step 10, the process is started.

Next, at step 20, a value of $\Delta T$ is set at zero.

Next, at step 25, the system switches the beam to a first sector, Sector A, for a time period $Ta=Ta+\Delta Ta$.

Next, at step 30, the system receives and counts (e.g., monitors) users' packets received and transmits a report (e.g., data related thereto) to, e.g., a register, Register A (RA).

Next, at step 40, the system switches the beam to another sector, e.g. Sector B, for a time period $Tb=Tb+\Delta Tb$.

Next, at step 50, the system receives and counts (e.g., monitors) users' packets received and transmits a report (e.g., data related thereto) to, e.g., a register, Register B (RB).

Next, at step 60, in some embodiments, the system makes a determination of whether there are two active streams. If the answer is yes, the system makes a determination at step 85 as to whether a timer value has been reached. If the latter answer is no, the system proceeds back to step 25. If the latter answer is yes, the system proceeds to step 5. On the other hand, if at step 60, the resulting answer is no, the system proceeds to step 70.

At step 70, the system switches the beam to another sector, e.g. Sector C, for a time period $Tc=Tc+\Delta Tc$.

Next, at step 80, the system receives and counts (e.g., monitors) users' packets received and transmits a report (e.g., data related thereto) to, e.g., a register, Register C (RC).

Then, the system proceeds back to step 85 as described above.

As depicted in FIG. 6, the data in the registers RA, RB and RC are preferably transmitted to one or more storage means, such as, e.g., computer storage or digital storage, such as, e.g., one or more database 1 and/or the like. As illustrated, the storage means 1 can include, e.g., input data (ID) received from the registers RA, RB and RC.

As also depicted in FIG. 6, output data (OD) including, e.g., time intervals computed for individual beam switchers can be stored in the same or another storage means, such as, e.g., one or more database 2.

In the illustrative system and method as shown in FIG. 6, the data in the database(s) 2 is input at step 90 so as to obtain a new value of $\Delta Ta$. As shown by the arrow between step 90 and step 25, this value is used in step 25 for controlling the respective beam switcher. Similarly, in the illustrative system and method as shown in FIG. 6, the data in the database(s) 2 is input at step 110 so as to obtain a new value of $\Delta Tb$. As shown by the arrow between step 110 and step 40, this value is used in step 40 for controlling the respective beam switcher.

Next, at step 100, a determination is made as to whether or not $\Delta Ta=\Delta Tb$. If the answer is yes, at a step 120, the system creates 3 beams using the beamformer B. On the other hand, if the answer is no, at the step 120, the system creates 2 beams using the beamformer B.

In addition, in the illustrative system and method as shown in FIG. 6, the data in the database(s) 2 is input at step 120 so as to obtain a new value of $\Delta Tc$. As shown by the arrow between step 120 and step 70, this value is used in step 70 for controlling the respective beam switcher.

In some embodiments, as depicted, e.g., in the illustrative example shown in FIG. 6, a BATA system and method can be used to control a) the beam dwell times per sector, b) the dwell patterns, c) the beam widths, d) the beam positions, e) the number of sectors and/or f) other aspects. In some preferred embodiments, a BATA algorithm can be implemented that a) counts the packets received from each sector, b) calculates the ratio, c) computes the value of $\Delta ta$, $\Delta tb$, $\Delta tc$ (e.g., time correction(s) provided to a beam switcher), and d) switches the beam to a deserved section for enhanced and/or a reduced time, accordingly. In some preferred embodiments, the system and method increases or decreases the beam splits as appropriate. In some embodiments, the resulting beams can have the same widths, and, in some embodiments, the resulting beams can have variable widths. By way of example, FIG. 5 shows an illustrative example in which one beam has a wider aperture (see, e.g., numeral 3) and two beams have smaller apertures (see, e.g., numerals 1 and 2).

In addition, in some embodiments, a BATA system and method can increase beam splits by a single (i.e., one) unit. However, this is an illustrative and more simplified embodiment. In a variety of other embodiments, BATA systems and methods employing multiple splits can be employed. In some embodiments, the values of $\Delta ta$, $\Delta tb$ and $\Delta tc$, discussed above, can be calculated using the respective equations (a), (b) and (c) illustrated in FIG. 7.

In illustrative embodiments employing the method and algorithm shown in FIG. 6, the beam width can be a function of the packets received from a certain sector. However, a variety of other embodiments can be implemented as would be appreciated by those in the art based on this disclosure. By way of example, in some other embodiments, a beam width can be made as a function of medium contention per sector, which in turn can depend on, e.g., the number of users-per-sector and the traffic pattern.

In some other embodiments, the trigger at step 5 to start or initiate a methodology and/or algorithm similar to that shown in FIG. 6 can be timed (such as, e.g., employing a timer at step 85). In some embodiments, the method and/or algorithm can be adapted so as to run more and/or less frequently based on a past history of, e.g., the traffic pattern and the beam traversal (e.g., by users 20).

In some preferred embodiments, one or more, preferably all, of the following features are employed:

a) The provision of a beam-former in a WLAN system to induce large and fast variations, which are otherwise absent in typical WLAN systems. Notably, the effectiveness of opportunistic media access depends largely on the magnitude of channel variations.

b) The provision of a scheduler that decides whether or not a station will content for the medium, when appropriate. Notably, this feature can have a substantial impact in the reduction of collisions in a heavily loaded medium.

c) The provision of a methodology to make use of a CF-Poll messages provided in 802.11e to form link-quality estimates. On the other hand, certain prior work involved the creation of new message formats based on variations of RTS-CTS to estimate channel quality. Among other things, this present methodology can be more efficient and can avoid the need to create new and proprietary message formats.

For some background information related to inducing and exploiting channel variations, reference is made to P. Vishwanath, D. N. Tse, R. Laroria, *Opportunistic Beamforming Using Dumb Antennas*, IEEE Transactions on Information Theory, 2002, the entire disclosure of which is incorporated herein by reference (hereinafter Reference 4). However, Reference 4 deals with the cellular system which has a centralized scheduling system. On the other hand, the preferred embodiments herein relate to, inter alia, the distributed medium access mechanism of WLAN system and/or the like.

According to the preferred embodiments of the invention, a system and method is provided that exploits a form of diversity known as multiuser diversity provided by independent time-varying channels across the different users. However, multiuser diversity is not present in WLAN systems in a similar manner to that in a cellular network to derive notable performance gains. Among other things, the absence of inherent multiuser diversity in WLAN systems has made the preferred embodiments of the present invention non-obvious to those in the art. Moreover, the unworkable timescale of inherent channel variations and the absence of control signals to measure channel variations periodically have further rendering the opportunistic use of such variations to be non-obvious to those in the art.

Moreover, under, for example, the IEEE 802.11 WLAN MAC layer specification, a station will initiate the contention process for a channel as soon as a MAC packet is present. Accordingly, this essentially results in the same degree of contention (e.g., collisions) even with the presence of any opportunistic media access scheme. As a result, this effect significantly reduces the potential gains obtained by such a scheme, further rendering the preferred embodiments of the present invention to be non-obvious to those in the art.

Illustrative Advantages and Benefits

In some embodiments, one or more, or all, of the following advantages and benefits can be achieved:

1) Improved throughput: In some embodiments, an improved overall throughput in a WLAN system can be achieved (such as, e.g., in some illustrative embodiments, a 98% improvement obtained under saturation conditions);

2) Improved energy efficiency: In some embodiments, an improved energy efficiency can be achieved. Where, e.g., energy effeciency is measured as the amount of energy (e.g., mAh) required to successfully convey (e.g., Mbit units) of information (such as, e.g., in some illustrative embodiments, a 53% reduction in the amount of energy required);

3) Increased range: In some embodiments, an increased range can be achieved. In some embodiments, the maximum reach of a WLAN system can be extended considerably by the use of, e.g., a directional beamforming antenna (such as, e.g., about 2.2 times under typical conditions); and/or 4) Greater time share: In some embodiments, a greater time share can be achieved. In this regard, the beamforming system, such as, e.g., when used in conjunction with 802.11e QOS mechanisms, can result in giving greater time share for supporting contention free traffic with higher QOS priorities.

Illustrative Applications

In some embodiments, principles of the preferred embodiments can be employed in, by way of example, Wireless LAN Access Points (AP) and/or Wireless LAN cards. In addition, in some embodiments, systems and methods can be employed which include an infrastructure WLAN system using such APs and/or such wireless LAN cards which can deliver substantially higher or improved throughputs and/or work with substantially higher or improved energy efficiency.

Details Related to Some Preferred Embodiments

In some preferred embodiments, one notable goal is to enhance the existing contention based distributed MAC protocol for 802.11, to be used in the next generation WLANs, with the effect that individual stations and the WLAN system as a whole have, e.g.:

1) better throughput performance; and/or
2) better utilization of energy spent.

Furthermore, the enhanced architecture should preferably maintain a close degree of match to the fairness that the current 802.11 MAC provides among stations.

For achieving the goal of, e.g., enhancing the existing contention based distributed MAC protocol for, e.g., 802.11, in some preferred embodiments, the system architecture does the following:

1) reduces inter-transmission delays; and/or
2) reduces collision probability.

In the preferred embodiments, by making the MAC layer aware of channel variations and exploiting such variations appropriately, the above goals can be achieved. Towards this end, in some preferred embodiments, a Distributed Opportunistic Scheduling (DOS) scheme is utilized. Preferably, this scheme exploits the induced multi-user diversity by attempting to transmit back-to-back packets when the channel conditions are most favorable, leading to reduction in the inter-transmission delays. Preferably, no transmission attempt is made when channel conditions are unfavorable, which helps to reduce the collision probability. In the preferred embodiments, the use of a beam-former at the AP helps to create large and frequent variations in channel conditions among users. In preferred embodiments, by controlling the beam forming parameter(s), the instantaneous channel conditions experienced by groups of stations can be made as un-correlated as possible, thereby providing a multi-user diversity effect.

In an infrastructure WLAN system, by way of example, the AP has a queue that contains downlink packets for the various stations, and, similarly, the stations have uplink packets queued up to be sent to the AP. Under the current contention based 802.11 MAC protocol, a station or an AP which has packet to transmit senses the medium and initiates the transmission procedure (e.g., back off+deferral+transmission), as soon as the medium is sensed to be free. When a station, for example, wins the contention process, it is allowed to transmit only one packet onto the medium. In short, under the current system, the MAC layer behaves in the same manner at all times, independent of the channel conditions.

Distributed Opportunistic Scheduling (DOS)

In preferred embodiments, a notable input to make distributed opportunistic scheduling possible in a station or an AP is for the MAC layer to form an estimate of the link-quality (e.g., of the link between itself and the recipient). The link-quality estimate (hereinafter, referred to as link-quality) is preferably based on the station's or AP's current estimate of Signal to Noise Ration (SNR)/channel condition (or Received Signal Strength Indicator (RSSI)). Preferably, the link-quality is a relative estimate, which is formed by comparing the current SNR with recorded past SNRs. This is discussed in further detail below in this document. At any given time, in some embodiments, the station's or the AP's link-quality can take one of three values: good, normal or bad.

In preferred embodiments, the DOS scheme proposes a channel aware-MAC layer which operates in one of the three modes, based on the link-quality.

1) Packets are transmitted back-to-back on the medium, if the link-quality is determined to be "good;"
2) Packet transmission process is suspended (including, e.g., random back-off) if the link-quality is determined to be "bad;"
3) One packet is transmitted, otherwise, in a "normal" mode of operation.

In some embodiments, the EDCA TXOP (Transmission Opportunity) mechanism provided in 802.11e can be used to transmit back-to-back packets onto the medium. As shown in FIG. 2, which depicts three modes of MAC operation based on link quality, as long as the link-quality is good, and within the maximum duration of TXOP (8160 usec), packets are transmitted after waiting an SIFS duration. However, during the time when the link-quality is bad, the packets transmission process is not initiated, even if the queue is non-empty.

Beamforming by the AP

In preferred embodiments, large and frequent variations in the link-quality perceived by stations are significant for the performance of the DOS scheduling scheme. Another significant factor is to make the link-quality at a given time as uncorrelated as possible among the various stations. Whereas the mobile movement in a cellular environment can give rise to these desirable qualities, typical WLAN environments (e.g., indoor WLAN environments, etc.) offer only limited variations in link-quality.

In the preferred embodiments, a beam-forming AP is, thus, proposed to induce such large, frequent and wide variations across various stations. As shown in FIGS. 3(A) and 3(B), at a given time, the directional beam pattern of AP (schematically shown by the shaded region within dashed lines in these figures) divides the nearby stations into two sectors, creating a wide variation in link-quality perceived across all the stations. Furthermore, in the preferred embodiments, the AP is configured so as to switch the beam forming pattern from time to time to cover all or substantially all of the stations within the range of the AP.

Preferably, when the stations operate based on a DOS scheme, at any time, those stations present in a currently serving sector (e.g., a sector to which the AP beam-former directs its beam pattern), will experience a good link-quality, prompting those stations to, e.g., send multiple back-to-back packets, thus, making use of a high directional gain. At the same time, stations far away from the currently serving sector will preferably perceive the current link-quality as bad and will preferably stop or inhibit themselves from transmitting. As a result, this scheme can help to create much less collision probability for stations which are currently ready to transmit. In an ideal situation, the stations will preferably wait for their turn to come (e.g., for the link-quality to be good) and will then preferably transmit for longer durations when conditions permit (e.g., when there is a good link-quality). In addition, preferably the stations behave in a normal mode (e.g., sending one packet and then re-contending for the medium) when the link-quality is in-between good and bad. For example, such normal or in-between stations may include, e.g., stations at the edge of the currently serving sector.

Scheduling at the AP

In some preferred embodiments, the DOS decisions that the stations in, e.g., an infrastructure WLAN system have to make can be expressed as "when to transmit?" However, as noted above, the AP may potentially have packets to transmit to multiple stations at any given time. If there are a sufficient number of stations in a network, it is a reasonable assumption that at any given time, the AP queue will have packets whose destination link-quality will be a mixture of good, normal and bad. Hence, the DOS decision that is appropriate for the AP can be "who to transmit?" at any given time.

In summary, the DOS unit in a station preferably takes the link-quality to the AP as the input, and determines an appropriate link-quality (such as, e.g., in the preferred embodiments good/normal/bad) and accordingly controls its medium access behavior.

In the preferred embodiments, the DOS unit in the AP uses the link-quality estimate to all AP-queue packet destinations. Based on theses link-qualities, the AP then selects the packet(s) corresponding to one of the destination stations to be transmitted to next.

The preferred details on how to categorize the link-quality (such as, e.g., as good, normal or bad) and the basis for the AP to select a station are described further below in this document. Notably, the input to the DOS unit does not need to be restricted to only link-quality; for example, this can include, e.g., higher layer parameters or qualities like, for example, queue length, queue delay, type of service, etc. In some embodiments, theses can serve as additional and/or alternative mechanisms (e.g., on top of the various Quality of Service (QoS) queue parameters for 802.11e), such as, e.g., to differentiate users on the basis of their QoS requirements.

Simulation Results

As explained above, a significant objective in some preferred embodiments is to provide enhancements to the distributed contention-based 802.11 MAC protocol, so as to achieve improved throughput performance and more efficient energy consumption, among other potential advantages, while maintaining the fairness, such as, e.g., provided by the current 802.11 MAC protocol. This section discusses an illustrative comparison between some illustrative embodiments of the invention and an existing normal system (based on current 802.11 MAC protocol) performance with respect to the following metrics:

1. system throughput;
2. energy consumption;
3. fairness; and
4. delay performance (e.g., voice capacity).

For comparing the first three metrics, an infrastructure WLAN system was considered having data users, all transmitting, e.g., Constant Bit Rate (CBR) traffic to the WLAN AP using, e.g., UDP protocol. Consider, e.g., that the users are distributed uniformly across area in an annulus with a radii of within about, e.g., 10 m and 100 m and within the angles of about, e.g., 60 degrees to 120 degrees. The CBR traffic source generated packets at the rate of 20 Mbps and the packet length was 500 bytes. The parameters for 802.11a PHY and MAC layer were used in the simulation.

For simulating small scale fading effects an independent two-ray Rayleigh fading model was assumed and the Doppler velocity was assumed to be 0.1 m/sec. A rate-adaptive algorithm was used to select the best rate to transmit a packet (trying to keep the packet error rate approximately below 5%). Beacons were transmitted every 10 msec.

For the beamforming+DOS system, the user distribution was divided into three sectors. The beam centers were at about 70 degrees, 90 degrees and 110 degrees. The half beam width of the beam was about 20 degrees. The pause time (e.g., the time that the beam stayed in one sector) was 100 msec. The beamforming gain varied from about 12.5 dB to −15 dB based on the relative position.

In this illustrative and non-limiting embodiment, the overall system throughput was computed and averaged across 10 random runs of the simulation.

A. Throughput

A comparison of throughput in this illustrative example was as follows:

i) A normal system throughput was 8.85 Mbps;
ii) A beamforming+DOS system throughput was 17.5 Mbps.

Thus, the beamforming+DOS system demonstrated that it can outperform the normal system by about 100% in the total throughput attained in some illustrative embodiments.

B. Energy Efficiency

Here, the energy that is spent successfully is quantified in order to compare the energy efficiency of the two systems. One measure that can be used to perform such quantification is: Energy efficiency=Transmit/Receive energy (mAh) spent per information bit received successfully. In the illustrative example, calculations using data sheet specifications indicated that for a transmit power of about 17 dBm, about 250 mAh units of energy is spent. Hence, we can measure the energy efficiency as=about 250*Total Transmission Time/Good Bits.

In this context, a comparison of throughput in this illustrative example was as follows:

i) normal system energy efficiency=6.67 mAh/Mbit;
ii) beamforming+DOS system energy efficiency=3.14 mAh/Mbit.

Thus, in such an illustrative example, the beamforming+DOS system used only about half the battery life to transmit the same amount of information successfully as a normal system.

C. Collision Probability

In addition, in this illustrative example, the measured collision probability for the Beamforming +DOS system was about 10%, while the measured collision probability for the illustrative normal system was about 46%. This significant reduction in collision probability is a very most significant contributor towards the high throughput and energy efficiency.

Thus, a most notably advantage of the preferred embodiments involves a significant reduction in collision probability in heavily loaded WLAN networks.

D. Fairness

The current 802.11 MAC protocol is understood to be fair to all users in allocating equal medium access opportunities. However, the current protocol is not fair from, e.g., a throughput perspective. This is because the system ensures equal medium time for all users; however, based on the users' transmission rates the equal time translates into varying throughput.

For illustrative purposes, the Jain index metric R. Jain, W. Hawe, D. Chiu, *A Quantitative Measure of Fairness and Discrimination for Resource Allocation in Shared Computer Systems*, DEC-TR-301, September 1984 was used to compute the medium fairness. The index value ranges from 0 to 1 (with 1 being the most fair). If the time window over which the fairness is measured is smaller than 5 seconds, the example of the preferred embodiment scheme's fairness is less than about 0.5. For times greater than about 20 seconds the fairness of the example of the preferred embodiment is about 0.82. On the other hand, the normal 802.11 scheme has a fairness index very close to 1 for values of time greater than 10 seconds.

Throughput fairness was computed using a Min/Max metric. Essentially, the ratio of minimum to maximum throughput obtained across users was computed. Normal system produced a Min/Max throughput index of 0.6. On the other hand, the beamforming system gave values close to 0.55. Both are, understandably, found not to be very fair from a throughput perspective.

Accordingly, the beamforming+DOS system is demonstrated as performing at a level of fairness reasonably close to that of the normal system.

E. Voice Capacity

In an illustrative example, bidirectional voice traffic was setup between the stations and AP, to measure the voice capacity of the system. The delay budget was 90 msec and 98% of packets needed to meet the delay budget for a session to be considered supported.

It was demonstrated by the results is that the beamforming+DOS system performed better than the normal system (e.g., supported more voice users) as long as the packet arrival rate is fast as compared with the delay budget (for example, about a 10 msec packetization interval). But as the packetization interval increases, the normal system can support more users. This is because, in the beamforming+DOS system, as the packetization interval increases, the number of packets that can be sent back-to-back reduces, due to the delay budget requirement. Essentially, waiting to send multiple packets becomes more and more difficult, while not being able to send multiple packets reduces the efficiency of the beamforming+DOS system.

Illustrative Implementation Details

Figure 8:
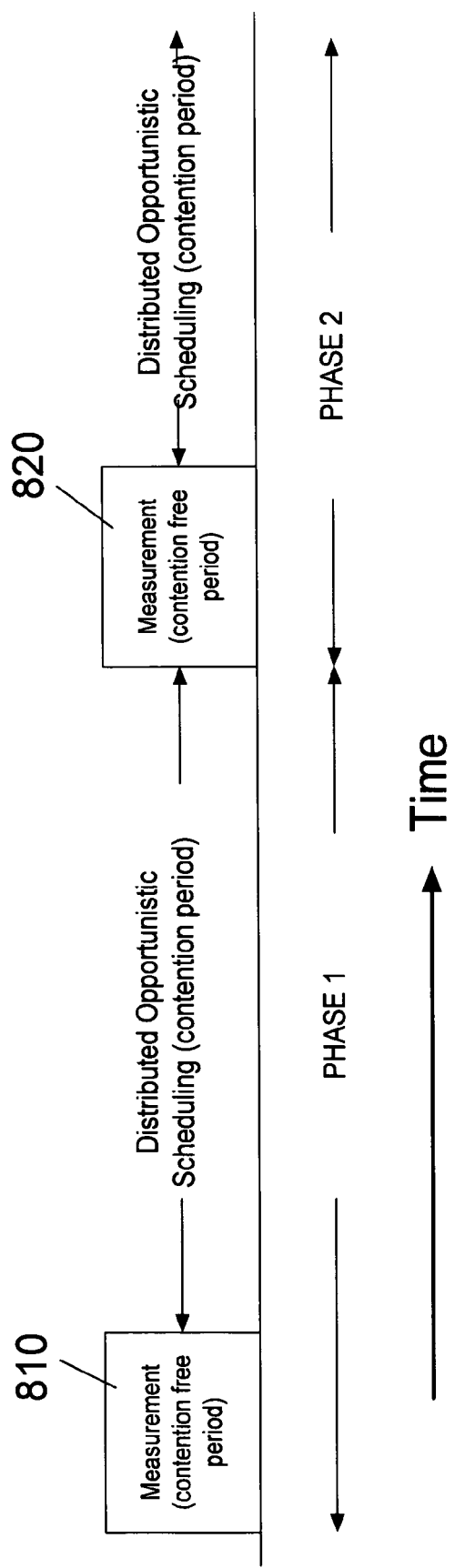
FIG. 8 is a schematic diagram depicting beam forming phases in some embodiments.

As indicated above, the DOS unit preferably uses the link-quality estimates to make scheduling decisions. Furthermore, the estimates are preferably updated at least once in each beam forming phase (e.g., a duration of time for which beam forming pattern is fixed). In this regard, FIG. 8 shows the time divided into two beam forming phases, Phase 1 and Phase 2, according to some illustrative embodiments. In this example, each phase has two periods: the initial measurement period 810 followed by the Distributed Opportunistic Scheduling period 820 when the stations or the AP do(es) the DOS. The measurement period 810 is preferably meant for the stations to measure the link-quality to the AP and for the AP to measure the link-qualities to the stations for which there are downlink packets queued. Notably, bounded measurement periods are employed at the beginning of each phase so that the remaining time can be used for the DOS. Accordingly, contention free periods are preferably used to do the measurements, followed by contention periods where DOS is at work.

A. Measurement Period

In some preferred embodiments, it is assumed that the next generation WLAN systems will be 802.11e compliant. Accordingly, the capability of the QAP (QoS AP, compliant with 802.11e) to start a Controlled Access Phase (CAP) is made use of, at the beginning of each beam forming phase, to do the link-quality measurements. In the CAP, the AP can re-gain access to the medium after sensing the medium idle for a Priority Inter Frame Space (PIFS) time. Preferably, the AP sends out a beacon as the first frame in this measurement CAP period. Preferably, the beacon is sent out at the lowest rate (e.g., 6 Mbps) which maximizes the probability that even stations that are not in the current beamforming sector may decode the beacon. Preferably, the signal strength with which a station receives the beacon forms the current link-quality input for the DOS unit at the stations. The reciprocal link assumption (e.g., between an AP and a plurality of stations) is a reasonable one for this purpose, under typical WLAN link conditions.

The next step is for the AP to measure the link-qualities of various stations. For this, preferably the DOS unit at the AP forms a list of stations who have packets queued up. The CF-Poll message in the 802.11e framework is used to obtain the link-qualities of stations by the AP. The CF-Poll (Contention Free Poll) message is originally meant to poll stations for data and to allot them TXOP (Transmission Opportunity) to transmit in a contention free manner. The AP specifies the duration of TXOP in the CF-Poll message. One goal in using the CF-Poll is to get a response packet from the concerned station and, hence, the TXOP duration is preferably set to the minimum time of 32 usec.

In this regard, a PIFS (priority inter-frame space) duration after sending the beacon, the AP starts sending CF-Poll messages to each of the stations in the AP queue-list with the TXOP duration set to 32 usec. Preferably, the CF-Poll messages (e.g., uni-cast) are sent at rates higher than the base rate (e.g., 6 Mbps) intentionally so that stations having poor link-quality will not be able to decode the message to them. This is appropriate since a goal of the AP scheduler is to avoid stations with poor link quality; thus, no response from those stations will be appropriately treated as poor link-quality. Preferably, if the station can decode the CF-Poll message addressed to itself, it responds after an SIFS duration either with a CF-Null packet (e.g., if the station has no packet queued up or if the TXOP duration of 32 usec is not enough to transmit a packet) or with a queued packet which will complete transmission in the allotted 32 usec.

Figure 9:
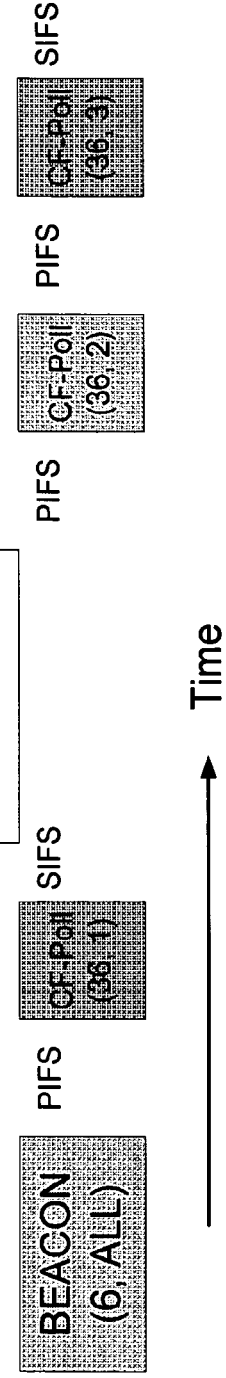
FIG. 9 illustrates an illustrative entire measurement cycle when there are 3 stations with packets queued at the AP.

In either case, the AP preferably receives a packet from the desired station (if it does not have poor link quality) and the signal strength of the response packet forms the input to the AP DOS unit. FIG. 9 illustrates an entire measurement cycle when there are 3 stations with packets queued at the AP. As shown, a message time line (see time line, labeled Time, illustrated along a horizontal X-axis) along with the stations that initiate the transmissions (see stations STA1, STA2, STA3 illustrated along a vertical Y-axis). Preferably, the AP sends out the beacon message first (e.g., BEACON (6,ALL)) at 6 Mbps and addressed to ALL stations. This enables all stations that can decode the message to estimate the link-quality. In the illustrated example, after a PIFS duration, the AP sends out CF-Poll message to station STA 1 at 36 Mbps. The station STA1 decodes the message and responds after an SIFS duration with a packet that fits in the 32 usec duration. Then, the AP estimates the link-quality for STA 1. Then, the AP sends a CF-Poll message to station STA 2 at 36 Mbps, after another PIFS duration. In this example, it is assumed the station STA2 cannot decode the message (e.g., not being in the current beamforming sector); accordingly, sensing the medium idle for a PIFS duration (e.g., where SIFS<PIFS), the AP sends another CF-Poll message to the station STA3. Then, the station STA3 decodes the message, but in the illustrative example has no packet to transmit and, hence, returns a CF-NULL message to the AP. Thus, at the end of the cycle in this illustrative example, the AP has the link-quality estimates of station STA1 and station STA3 and concludes that station STA2 has poor link-quality.

B. Illustrative Features of an AP

Figure 10:
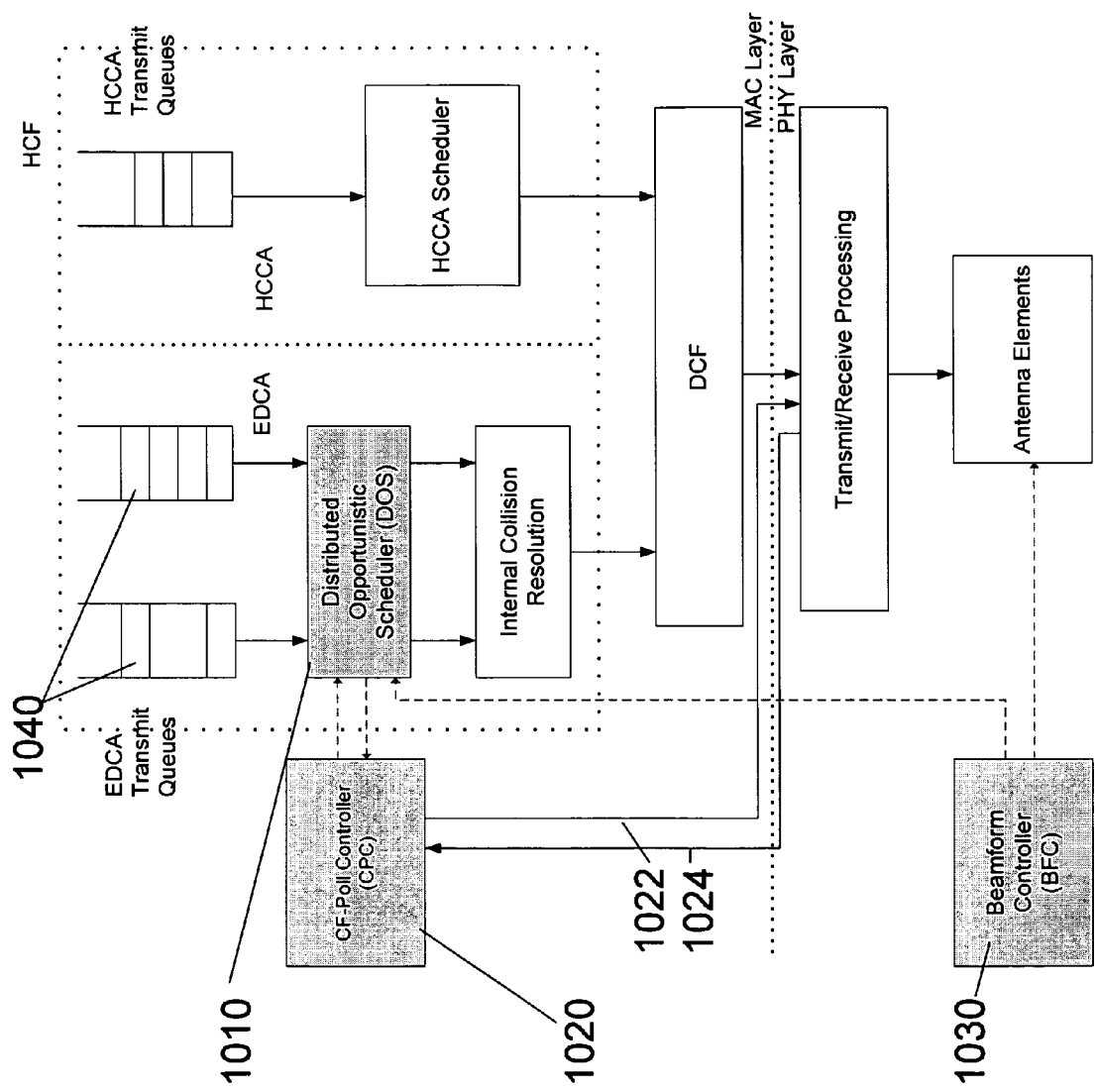
FIG. 10 is an architectural diagram of an illustrative AP.

FIG. 10 shows a simplified block diagram of the proposed next generation AP with beamforming and DOS units. Since we assume compatibility with 802.11e, this example shows the Hybrid Co-ordination Function (HCF) as a combination of the contention-based EDCA (enhanced distributed channel access) and the controlled HCCA (HCF based polling channel access) modes, with separate queues for each.

In the preferred embodiments, there are three new blocks or modules as shown by the shaded units 1010,1020 and 1030 in FIG. 10. The remaining components of the AP, as illustrated, can be generally similar to that of existing devices. In this regard:

1. The DOS unit 1010 preferably includes the following functionality. It preferably makes scheduling decisions about which station to transmit packets to and which of the medium access modes to operate in at a given time. Preferably, the link-quality estimates needed for making the decision are obtained with the help of CF-Poll controller unit 1020.
2. The CF-Poll controller unit (CPC) 1020 preferably includes the following functionality. It preferably generates a CAP (Controlled Access Phase) and sends CF-Poll messages to individual stations, as requested by the DOS unit 1010. Furthermore, the responses from the stations are preferably reported to the DOS unit 1020 for estimation of link-quality.
3. The beamform controller unit (BFC) 1030 preferably includes the following functionality. It preferably controls the antenna elements weights so as to form specific beam patterns. Preferably, the BFC unit 1030 informs the DOS unit 1010 of any change in the beam forming pattern.

C. Illustrative Message Flow Sequence

An illustrative typical message flow sequence is listed below, demonstrating illustrative interactions between the various units and how the system works in some preferred embodiments.

First, the BFC unit 1030 starts a new beam forming phase by selecting a particular beamforming pattern. Preferably, the times at which a new phase can start are multiples of beacon times, so that the first packet that goes on the medium in the new phase is a beacon signal.

Second, the BFC unit 1030 informs the DOS unit 1010 of the change in pattern. This tells the DOS unit 1010 to refresh the link-quality estimates.

Third, the DOS unit 1010 based on the packets distributed across various EDCA queues 1040, forms a list of destination stations. The DOS unit 1010 informs the CPC unit 1020 of the list of stations.

Fourth, the CPC unit 1020 starts a CAP period, and sends out CF-Poll messages for individual stations (e.g. sent out over transmission path 1022 shown in FIG. 10). The CPC unit 1020 forms a list of signal strength values, based on the CF-Poll response packets from the stations (e.g., received over reception path 1024 shown in FIG. 10). After sending out CF-Poll to all the required stations, the CPC unit 1020 informs DOS unit 1010 of the list of signal strengths collected.

Fifth, the DOS unit 1010 determines the link-quality estimate based on the signal strength values it received from the CPC unit 1020.

Sixth, the DOS unit operates an appropriate scheduling algorithm.

D. Illustrative Features of a Station

Figure 11:
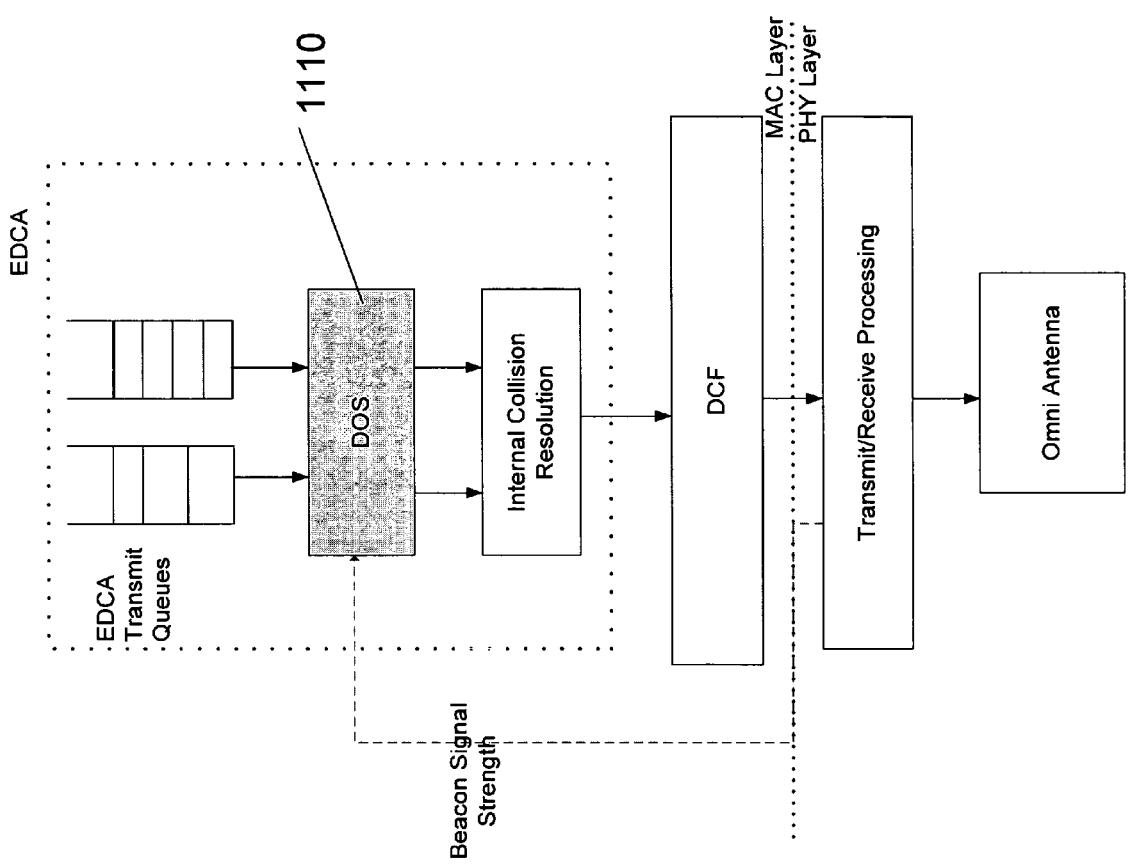
FIG. 11 is an architectural diagram of an illustration station.

FIG. 11 is an architectural block diagram of an illustrative station according to some of the preferred embodiments. In this illustrative embodiment, the only additional unit required for the station is a DOS unit 1110. In addition, the DOS unit 1110 requires the lower layers to inform it of the signal strength of received beacons. As explained earlier, preferably when a new beamforming phase starts, the first packet that is sent out will be the beacon, and stations which can decode the beacon packet will update their DOS unit 1110 with the beacon signal strength.

The remaining components of the stations, as illustrated, can be generally similar to that of existing stations.

E. Operation of a DOS Unit

The scheduling decisions taken by a DOS unit should preferably not affect the priority based medium access mechanism provided by EDCA. Since EDCA provides for multiple packet queues based on QoS type, the DOS unit preferably has to make scheduling decisions for each of the queues independently.

Notable for the scheduling algorithm is the notion of relative link-quality. In this regard, a decision on the categorization of link-quality as good/normal/bad is preferably done by comparing the current signal level with a past history. An illustrative example is given below which compares the average of the past 1000 signal levels with the current signal level. Here, $c(n)$ denotes the current signal level sample, $\mu$ denotes the mean signal level based on the past 1000 samples, and $\sigma$ denotes the standard deviation based on the past 1000 samples. With this, in some illustrative embodiments, the following formula indicates that the link-quality is good:

$$c(n) \geq \mu(n-1, \ldots, n-1000) + \sigma(n-1, \ldots, n-1000)$$

Similarly, in some illustrative embodiments, the following formula indicates that the link quality is bad:

$$c(n) \leq \mu(n-1, \ldots, n-1000) - \sigma(n-1, \ldots, n-1000)$$

Preferably, if the current signal level is found to be in between these two thresholds, then the link-quality is considered to be normal. Here, the values of the number of samples to be included in computing the past history and threshold values can be selected based on circumstances.

The DOS unit 1110 at the station preferably computes link-quality metrics with the AP and decides the mode of operation for the EDCA queues with packet, before starting the transmission process. If the only parameter considered by the DOS unit 1110 is the link-quality metric, then all queues with packets in the station will operate in the same mode at any given time. However, if parameters such as queue lengths and delays are considered, the EDCA queues could potentially operate in different modes.

On the other hand, the DOS unit 1010 at the AP will preferably decide for each EDCA queue, the station to transmit the next packet to as well as the mode to operate in. This changes the FIFO discipline of the queues and thereby helps to eliminate the Head Of Line (HOL) blocking problem. The HOL blocking problem refers to the inability of packets in a FIFO queue to be transmitted until the first packet in the queue gets transmitted successfully.

Figure 12:
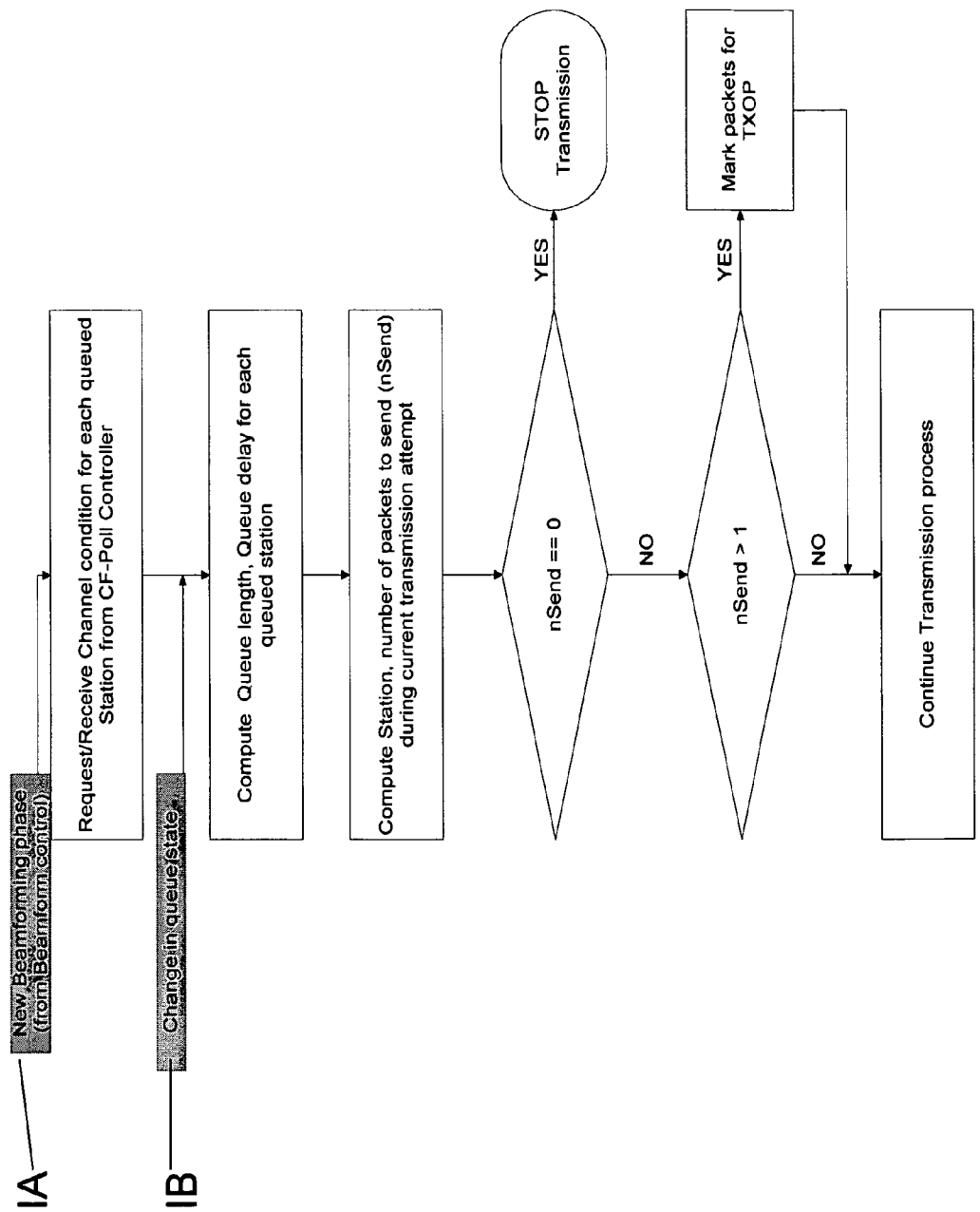
FIG. 12 is an illustrative flow chart depicting operation of a DOS unit.
Figure 13:
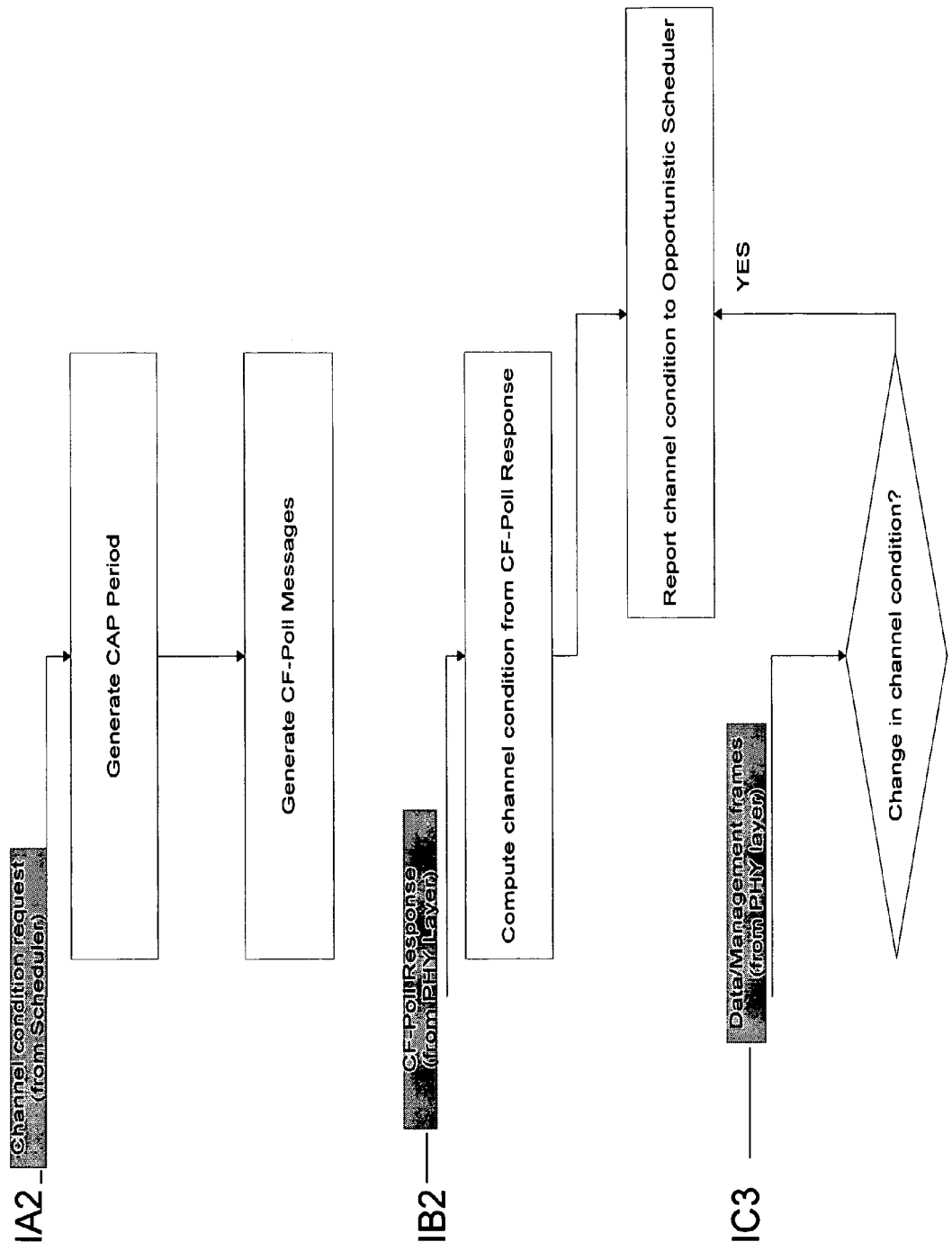
FIG. 13 is an illustrative flow chart depicting operation of a CPC unit.

FIGS. 12 and 13 provide flow charts representing the operation of the DOS unit 1010 and the CPC unit 1020, respectively, according to some illustrative embodiments. The shaded boxes IA and IB in FIG. 12 and IA2, IB2 and IC2 in FIG. 13 illustrate inputs from other units. The flowcharts, along with the message flow sequence described above, help demonstrate an inter-working between various units and how they achieve DOS in some preferred embodiments.

F. Co-Existence with HCCA

The contention-based EDCA and the controlled HCCA are complimentary mechanisms provided in the 802.11e standard. As such, the preferred beamforming+DOS scheme which proposes to enhance the operation of WLAN devices while in EDCA mode of operation should preferably co-exist with HCCA mode. This section illustrates how such a co-existence can be achieved in some embodiments.

The HCCA mode is provided so that the AP can initiate a contention free period at any time. Preferably, while using beamforming+DOS during the EDCA mode, the AP can still initiate a contention free period at any time. In this regard, the following two aspects are noteworthy:

a) The AP should discontinue the use of the EDCA beamforming pattern while switching to the HCCA mode, and should be able to switch back to the beam-forming pattern once the HCCA mode is over; and b) There should be a way for the DOS stations to differentiate between AP beacons while in the EDCA period from those during the HCCA period. This is needed since the DOS stations should ignore the beacon signal strength value (to measure link-quality) during the HCCA period. Preferably, the AP marks the beacons in EDCA period separately (e.g., using some reserved field bits), and the DOS at the stations check each beacon for this marking and update the DOS unit 1110 appropriately. However, this is not a strict requirement. If differentiation between AP beacons cannot be achieved, then the AP should make sure to send a beacon immediately after the AP ends the HCCA and goes back to the EDCA period.

Figure 14:
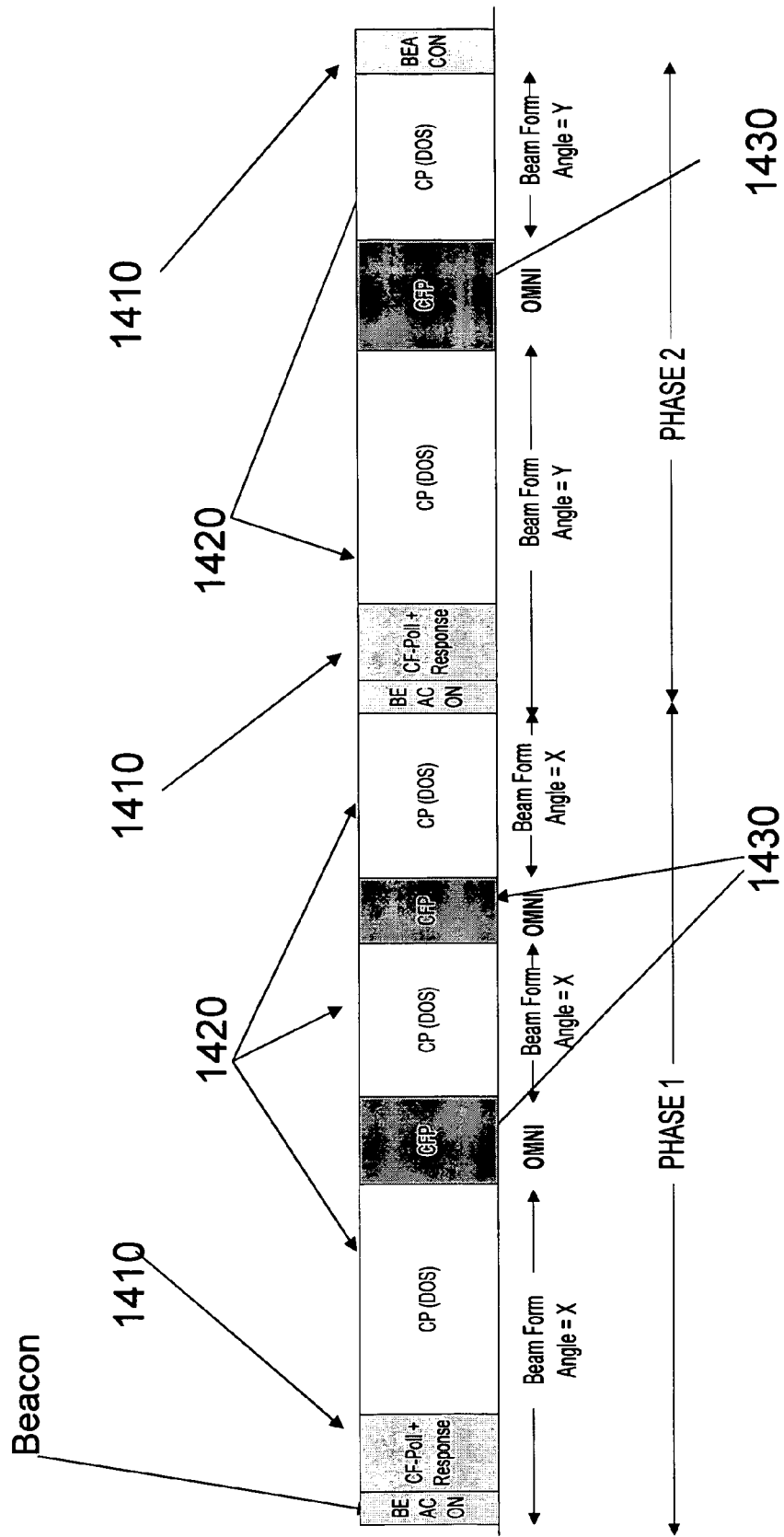
FIG. 14 is a schematic diagram illustrating co-existence of DOS and HCCA.

With these two relatively straightforward changes, the AP can switch between the HCCA and EDCA (with Beamforming and DOS) modes, such as, e.g., shown in FIG. 14. In this regard, FIG. 14 shows shaded portions 1410 as CAP periods used for measurement at the beginning of each beam forming phase (e.g., as explained above, such as, e.g., in relation to numerals 810 and 820 in FIG. 8). On the other hand, the non-shaded portions 1420 are contention-periods where DOS is at work. In addition, the AP also initiates HCCA CFPs (Contention Free Periods) as represented by shaded regions 1430 in between the DOS-Contention Periods 1420. As indicated at the bottom of FIG. 14, the AP antenna can preferably switch back and forth between beamforming (see, e.g., notations BeamForm Angle=x in FIG. 14) and omni-directional patterns (see, e.g., notations OMN in FIG. 14) based on the current mode of operation.

Other Embodiments and/or Aspects

Depending on circumstances, a variety of other aspects and embodiments may be provided based on a variety of considerations.

A. Presence of Legacy Stations

In some examples, legacy stations (i.e., here the term "legacy" station is meant to imply those stations that do not have a DOS unit along with 802.11e) may be present. As some examples, this could include stations that have the current 802.11 MAC or 802.11e stations that do not have the DOS unit.

In this regard, such legacy stations can transmit onto the medium as long as there are packets in its queue and the medium is found idle. However, when a legacy station is not in the current beam-forming sector, there is a potential that the legacy station will not be able to hear transmissions from the AP. Thus, assuming the medium is idle, the station will transmit, which can either result in collision (e.g., an AP may be transmitting at the same time) or in packet error (e.g., poor link quality with the AP). However, the probability of a successful transmission is low for significant periods of time so as to result in many lost packets. This will not only affect the performance of legacy systems, but that of DOS stations in it's vicinity as well.

In some embodiments, methods can be employed to overcome potential effects caused by the presence of legacy stations. Nevertheless, as long as legacy stations are present, some performance degradation may be unavoidable, but mechanisms to limit negative impacts related to such legacy systems can be employed. In some embodiments, such a "silencing" mechanism can include functionality to perform the following:

1) The silence mechanism should preferably silence the legacy stations that are far away from the current beam-forming sector (e.g., an assumption is that for such legacy stations defined as "far way," transmission to the AP even at the lowest rate will not be successful);

2) The silencing mechanism should preferably be careful not to silence those legacy stations that may be experiencing good channel quality. Accordingly, "selective silencing" should preferably be employed; and/or 3) The silencing mechanism should preferably not come at the cost of significant reduction in the performance gains that the beamforming+DOS system achieves. For example, the bandwidth required for sending any silencing messages should be kept to a minimum.

i. Low Power CTS Solution

A first such scheme, taking into considerations the aspects above can be employed as follows.

We assume a system where the DOS-stations (e.g., stations capable of performing opportunistic scheduling) and the legacy stations are distributed uniformly in the coverage area. Furthermore, the DOS stations will preferably have the additional capability to:

a) Calculate the time remaining in the current beam-forming phase. In this regard, the AP should include the duration of beam-forming phase in beacons, and the stations should keep track of time elapsed from the start of beam-forming phase;

b) Estimate whether the station is "far-away" from the current beam-forming sector. Here, "far away" denotes a sufficiently low received signal strength so that a station that transmits packets to the AP, even at the lowest available transmit rate, has a low probability of being decoded correctly at the AP; and c) Issue CTS-To-Self messages at low power.

Assuming that the DOS stations have such additional capabilities, when the DOS station determines that it is "far away" from the current beam-forming sector, it preferably:

a) Prepares a CTS-To-Self message with the period set to the remainder of the current beam-forming phase;

b) Does not transmit the CTS-To-Self message, if it hears any other low-power CTS-To-Self message;

c) Transmits the CTS-To-Self message, with a low enough power so that ideally only those stations in the same sector as itself can decode the message properly;

d) If during the remainder of the beam-forming phase, the DOS stations NAV mechanism receives a value less than that required to cover the remainder of the current beam-forming phase, it prepares another CTS-To-Self message. This CTS-To-Self message will be transmitted at the low power, if no other low power CTS-To-Self messages are received.

Preferably, the legacy stations that can decode the low-power CTS-To-Self message will update their NAV vectors so as to make them silent for the remainder of the current beam-forming duration.

In a variety of embodiments, various methods for estimating whether a DOS station is "far away" based on its link-quality can be implemented. In addition, what power levels should be used by the stations to transmit the low-power CTS-To-Self message, will impact the performance of such a scheme not to interfere with the normal network operation. In some examples, a simple analysis based on practical assumptions show that such a scheme is appropriate.

In this regard, assuming that the transmit power is reduced to −15 dBm (where, e.g., 17 dBm is the normal transmit power and 30 dBm dynamic range is a practical assumption), and assuming a propagation loss exponent of 3 (e.g., which is a typical indoor office value), a station at the distance of 20 m from the transmitter can, e.g., have a received signal level of around −100 dBm. Thus, such a low-power signal will not affect the operation of stations beyond about a 20 m radius. In the typical WLAN system (e.g., wide enough to have a sufficient number of stations, a heavily loaded network, etc), about a distance of 20 meters is a reasonable distance to be "far away" from the currently serving beam sector.

ii. AP Silencing

In this second illustrative solution, the AP sends "CTS-To-Self" messages to the sectors that are currently not being served. These messages preferably act as "silencing" mechanisms and make the legacy stations set their NAV vectors so that they do not transmit when the beamformer is not serving their sector.

Since this is a centralized "silencing" scheme, the AP can effectively silence selected sectors. However, the AP should send multiple "CTS-To-Self" messages within the same beam forming phase (e.g., since transmission from stations are omni-directional, it could be heard by legacy stations in other sectors and could end up in re-setting their NAV vector). And, this overhead incurred could potentially affect performance. A notable advantage of this scheme is that this can be adopted irrespective of whether the stations have DOS units.

B. 802.11n PHY Layer and Beamforming

The 802.11 TGn is in its early stages of formulating a PHY layer standard to achieve close to 200 Mbps raw data rate for next generation WLANs. Multiple input, multiple output antenna technology (MIMO) is one of the leading candidate technologies to be used by 802.11n. In this regard, one of the modes of operation of MIMO is to create parallel data streams and transmit them simultaneously using the multiple antennas. For this spatial multiplexing to work, MIMO uses a rich scattering environment (e.g., so that antennas are spatially uncorrelated).

However, when beamforming is employed, the beam may be made generally pointed, such that the rich multi-path environment which MIMO typically uses may have limited availability. Employing techniques to address this aspect of PHY layer performance of 802.11n when using beamforming may be desirable in some instances.

C. Load Balancing Beam-Former

For best performance of the preferred distributed scheduling scheme, it is helpful to divide sectors substantially uniformly in space (and/or in time) based on, e.g., the spatial distribution of stations. This means that the beam patterns are preferably adjusted based on the AP and based on information available on the distribution of stations. One convenient way to achieve this is for the AP to measure "channel-activity" (e.g., a measure of how much time the channel was active in each beam forming phase) and to adjust the beam pattern so that "channel-activity" is substantially uniform across all sectors. Thus, in some preferred embodiments, the AP will perform load-balancing functionality.

D. Parameter Optimization

There are a host of parameters that can make the proposed system a powerful tool to do tradeoffs between various performance metrics. The best performance that can be achieved by varying the parameters of beamforming and DOS for a given scenario can be evaluated based on circumstances.

Broad Scope of the Invention

In the preferred embodiments, a distributed scheduling technique is implemented that exploits induced channel variations to create a future WLAN system that has higher throughput performance and/or better energy utilization, and, at the same time, preferably achieves a fairness performance comparable with that of the current 802.11 scheme. Moreover, the preferred embodiments can also readily co-exist with future WLAN PHY layers, including 802.11n, and can take advantage of the proposed changes in 802.11e. The preferred embodiments can also create a system with a favorable tradeoff between complexity and performance. In some embodiments, hardware changes can be implemented only at the AP (e.g., providing new beam-former hardware). In some embodiments, other changes can be implemented in, e.g., firmware and/or software. For example, the stations can be upgraded by essentially only a firmware upgrade to install the DOS unit in some embodiments. Furthermore, the system will preferably be compliant to 802.11 standards and will preferably not require any special messaging.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for improving performance and/or energy utilization in a WLAN system, comprising:
   a) inducing fluctuations in signal strength transmitted from an access point to stations within a transmission range of the access point; and
   b) exploiting the induced fluctuations using a distributed scheduling algorithm to make the stations channel aware and opportunistic, said distributed scheduling algorithm including that said stations are induced to wait to transmit packets until the induced fluctuations in signal strength transmitted from the access point cause said stations to have a certain link quality.

2. A system for enhancing the performance of a WLAN system, comprising:
   a) an access point having a variable beamformer configured to fluctuate signal strength as perceived by stations within a range of the access point;
   b) a plurality of stations having modified distributed-MAC protocol such as to be channel-aware and opportunistic using a distributed scheduling algorithm, said distributed scheduling algorithm including that said stations are induced to wait to transmit packets until the induced fluctuations in signal strength transmitted from the access point cause said stations to have a certain link quality and wherein said stations are configured such that their MAC behavior depends on their perceived link quality.

3. The system of claim 2, wherein said stations are configured to either transmit multiple back-to-back packets or to not contend for the medium based channel in response to variations from the variable beamformer.

4. The system of claim 2, wherein said variable beamformer is configured to change a beamforming pattern to cover different stations at different time periods.

5. The system of claim 4, wherein said beamformer creates a beamforming pattern such that stations inside of the beamforming pattern have a high link-quality and stations outside the beamforming pattern have poor link-quality.

6. The system of claim 5, wherein said system is configured such that if the link-quality is above a certain good threshold packets are transmitted back-to-back and separated by a short SIFS period.

7. The system of claim 5, wherein said system is configured such that if the link-quality is within a certain normal range, packets are transmitted one a time, requiring re-contention and winning the medium to send another packet.

8. The system of claim 5, wherein said system is configured such that if the link-quality is below a certain bad threshold, packets are not transmitted onto the medium.

9. The system of claim 4, wherein said system is configured to categorize link quality at the stations and to opportunistically vary transmission based on said link quality.

10. The system of claim 9, wherein said system is configured to compare link-quality with two thresholds so as to categorize link quality in categories representing good, normal and bad link quality.

11. The system of claim 2, wherein said stations are configured to perform a distributed scheduling in which stations wait until the beamforming pattern enables them to have a sufficient quality link before the station will transmit packets, and wherein said WLAN system is an 802.11 system.

12. The system of claim 2, wherein said stations are configured such that their MAC behavior vary depending on a perceived link-quality categorization.

13. The system of claim 2, wherein said access point is configured to provide an adaptable beam-traversal timing functionality to adaptively change the dwell time in each sector to devote more time in a sector of a given area where more users are clustered.

14. The system of claim 2, wherein said access point is configured to provide an adaptable beam-traversal timing such that the beamformer adaptively changes the beam dimensions.

15. The system of claim 2, wherein said access point is configured to provide an adaptable beam-traversal timing such that the beamformer adaptively changes beam widths or positions.

16. The system of claim 2, wherein said access point is configured to provide an adaptable beam-traversal timing such that the beamformer adaptively changes the total number of sectors.

17. The system of claim 2, wherein said access point is configured to modify said beam so as to enable reduced sets of said stations to have strong signals at intervals of time.

18. The system of claim 2, wherein said access point is configured to control a) beam dwell times per sector or beam dwell patterns, b) beam widths or beam positions, and e) a number of sectors.

19. The system of claim 2, wherein said access point is configured to either count packets received from each sector or to determine channel activity or contention from each sector and to compute a value of time correction for controlling a beamformer switcher to switch the beam accordingly.

20. The system of claim 2, wherein said stations are configured such as to perceive said fluctuations in signal strength and to withdraw from a contention process based on certain perceived signal strengths.

21. The system of claim 2, wherein said stations are configured to make decisions regarding the contention process based on current channel conditions.

22. The system of claim 2, wherein said stations are configured so as to dynamically change behavior between packets.

23. The system of claim 2, wherein said access point is configured so as to intentional vary transmission power and to intentionally induce said fluctuations in signal strength transmitted from an access point to stations within a transmission range of the access point.

24. A method for enhancing a WLAN infrastructure system, comprising:
using Distributed Opportunistic Scheduling (DOS) to exploit an access point radiation-beam induced multi-user diversity,
providing variations in channel conditions among users, by transmitting back-to-back packets when channel conditions are favorable to reduce inter-transmission delays and by withholding transmission when channel conditions are un-favorable to reduce collision probability using a distributed scheduling algorithm, said distributed scheduling algorithm including said stations waiting to transmit packets until induced fluctuations in signal strength transmitted from the access point cause said stations to have a high link quality and said stations varying their MAC behavior based on their perceived link quality.

25. An improved WLAN system, comprising:
a) an access point including:
a distributed opportunistic scheduling unit configured to make scheduling decisions about which station to transmit packets to and which medium access mode to operate in;
a poll control unit configured to send messages to stations and to receive responses from stations and to report to said distributed opportunistic scheduling unit based on said responses; and
a beamform controller unit configured to control an antenna to form specific beam patterns; and
b) at least one mobile station including:
a distributed opportunistic scheduling unit configured to make scheduling decisions, which computes quality metrics with the access point and decides the mode of operation before starting a transmission process.

* * * * *